(12) United States Patent
Nakamura et al.

(10) Patent No.: US 7,664,032 B2
(45) Date of Patent: Feb. 16, 2010

(54) COMMUNICATION TERMINAL AND COMMUNICATION NETWORK

(75) Inventors: Nobuyuki Nakamura, Osaka (JP); Youiti Kado, Kyoto (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 985 days.

(21) Appl. No.: 10/981,630

(22) Filed: Nov. 5, 2004

(65) Prior Publication Data

US 2005/0099983 A1 May 12, 2005

(30) Foreign Application Priority Data

Nov. 10, 2003 (JP) ............................ 2003-379638
Nov. 11, 2003 (JP) ............................ 2003-380814

(51) Int. Cl.
*H04L 12/26* (2006.01)
*H04L 12/56* (2006.01)
*H04J 3/24* (2006.01)
*H04W 40/00* (2009.01)

(52) U.S. Cl. ...................... 370/235; 370/349; 370/351; 370/395.3; 455/9; 455/445

(58) Field of Classification Search ................ 370/235, 370/349, 351, 395.3; 455/9, 445
See application file for complete search history.

(56) References Cited

U.S. PATENT DOCUMENTS

| | | | | |
|---|---|---|---|---|
| 5,956,342 | A * | 9/1999 | Manning et al. | 370/414 |
| 6,026,444 | A * | 2/2000 | Quattromani et al. | 709/232 |
| 6,445,706 | B1 * | 9/2002 | Fransson et al. | 370/395.42 |
| 6,934,289 | B2 * | 8/2005 | Lee | 370/395.1 |
| 7,006,518 | B2 * | 2/2006 | Ornes et al. | 370/458 |
| 7,254,140 | B1 * | 8/2007 | Rokhsaz et al. | 370/465 |
| 2004/0042479 | A1 * | 3/2004 | Epstein et al. | 370/432 |

FOREIGN PATENT DOCUMENTS

JP  2003-152786 A  5/2003

(Continued)

OTHER PUBLICATIONS

C. Perkins et al. "Ad Hoc On-Demand Distance Vector (AODV) Routing"; University of Cincinnati, Jul. 2003—also available Internet as of Oct. 16, 2003 URL http://www.ietf.org/rfc/rfc/3561.txt.

(Continued)

*Primary Examiner*—Alpus H Hsu
(74) *Attorney, Agent, or Firm*—Rabin & Berdo, P.C.

(57) ABSTRACT

Each node or terminal in a communication network is capable of generating routing information for routing packets from an arbitrary source terminal to an arbitrary destination terminal on both a single-path route and a multipath route. The routing information is placed in packets transmitted to neighboring communication terminals, and analyzed in packets received from neighboring terminals. The single-path route is spatially or temporally separated from the multipath route so that the single-path route does not receive interference from the multipath route. Temporal separation may be effected by suspending the transmission of packets temporarily at each communication terminal on the multipath route. Spatial separation may be effected by using the routing information to designate different zones in the network, the single-path route being disposed in one zone, the multipath route in another zone.

14 Claims, 30 Drawing Sheets

FOREIGN PATENT DOCUMENTS

JP         2003-218886 A      7/2003

OTHER PUBLICATIONS

Mahesh K. Marina et al. "On-Demand Multipath Distance Vector Routing in Ad Hoc Networks"; Department of Electrical & Computer Engineering and Computer Science, University of Cincinnati—also available Internet as of Oct. 16, 2003 at URL http://www.cs.sunysb.edu/~samir/Pubs/icnp-01.pdf.

K. Dobashi et al, "One hop on-demand ad-hoc routing considering nodes availability", IPSJ SIG Notes 2002-AVM-38-25, vol. 2002 No. 106, pp. 137-142, Information Processing Society of Japan, Nov. 15, 2002.

Nakamura et al., "Low latency route switching for wireless ad hoc networks", Technical Report of IEICE IN2003-115, The Institute of Electronics, Information and Communication Engineers, vol. 103 No. 425, pp. 13-18, Nov. 7, 2003.

Y. Kado, "A novel routing scheme in which each terminal autonomously decides relay priority and strength and sensed carrier", IEICE Technical Report, Japan, The Institute of Electronics, Information and Communication Engineers, Apr. 21, 2000, RCS200-6, pp. 35-42.

Y. Kado, "A novel routing scheme in which each terminal autonomously decides relay priority based on the receiving signal strength", Proceedings of the 2000 IEICE General Conference, Japan, The Institute of Electronics, Information and Communication Engineers, Mar. 7, 2000, communication 1 B-5-164, p. 549.

* cited by examiner

FIG.15
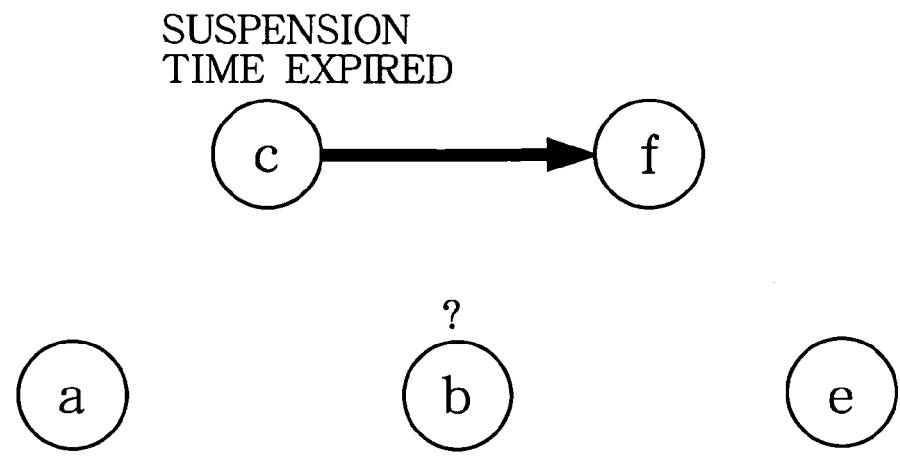
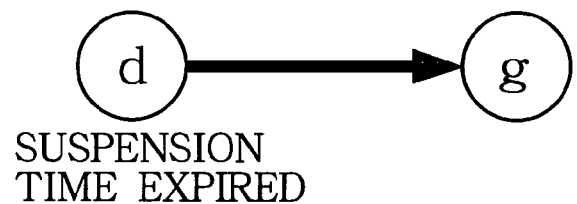
FIG.16
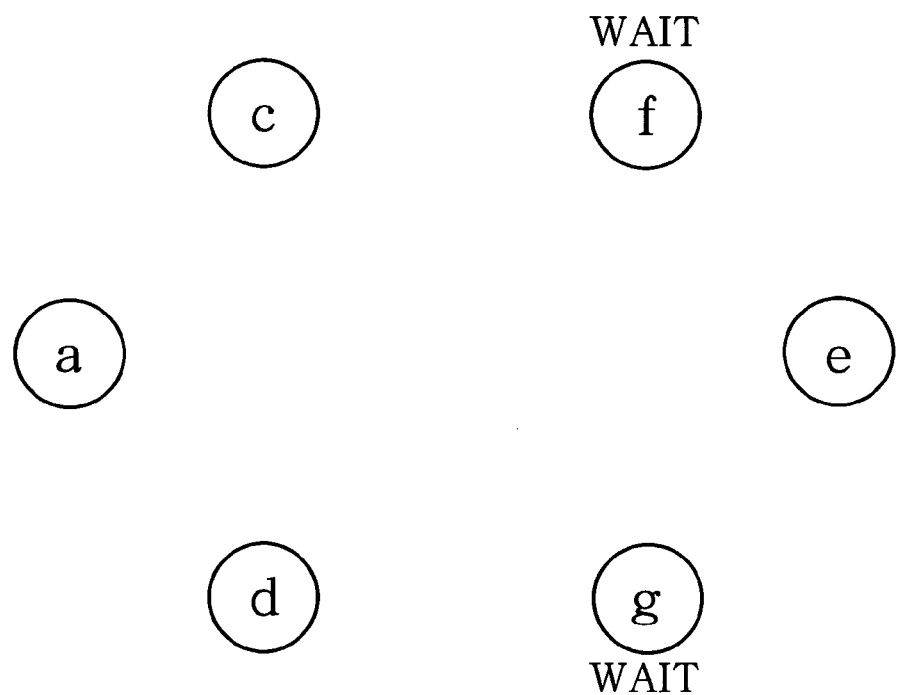

FIG.29

DV TABLE

| DESTINATION | PRIMARY DISTANCE VECTOR | OTHER DISTANCE VECTOR | PACKET ID |
|---|---|---|---|
| D | A | B, C | 51251 |
| S | B | C | 32135 |
| P | C | A, B | 76931 |
| Q | A | B, C | 67911 |

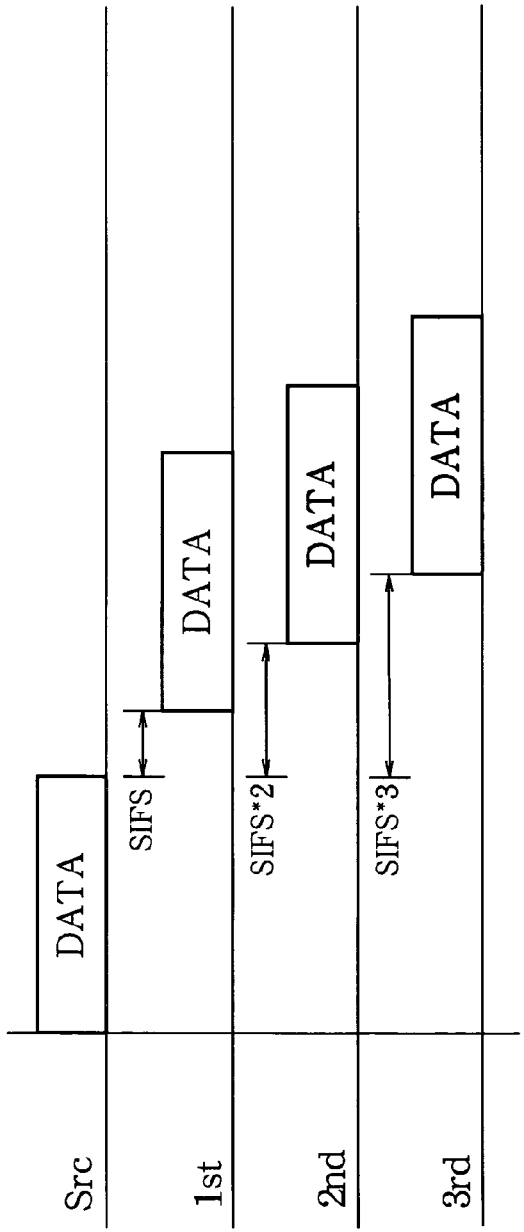
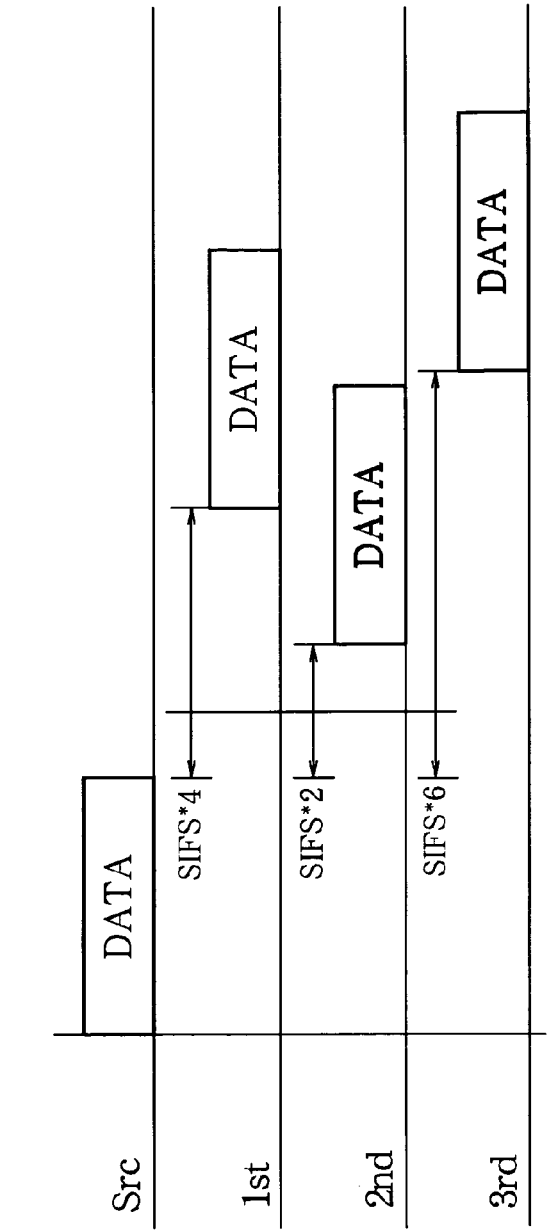
FIG. 32A
FIG. 32B

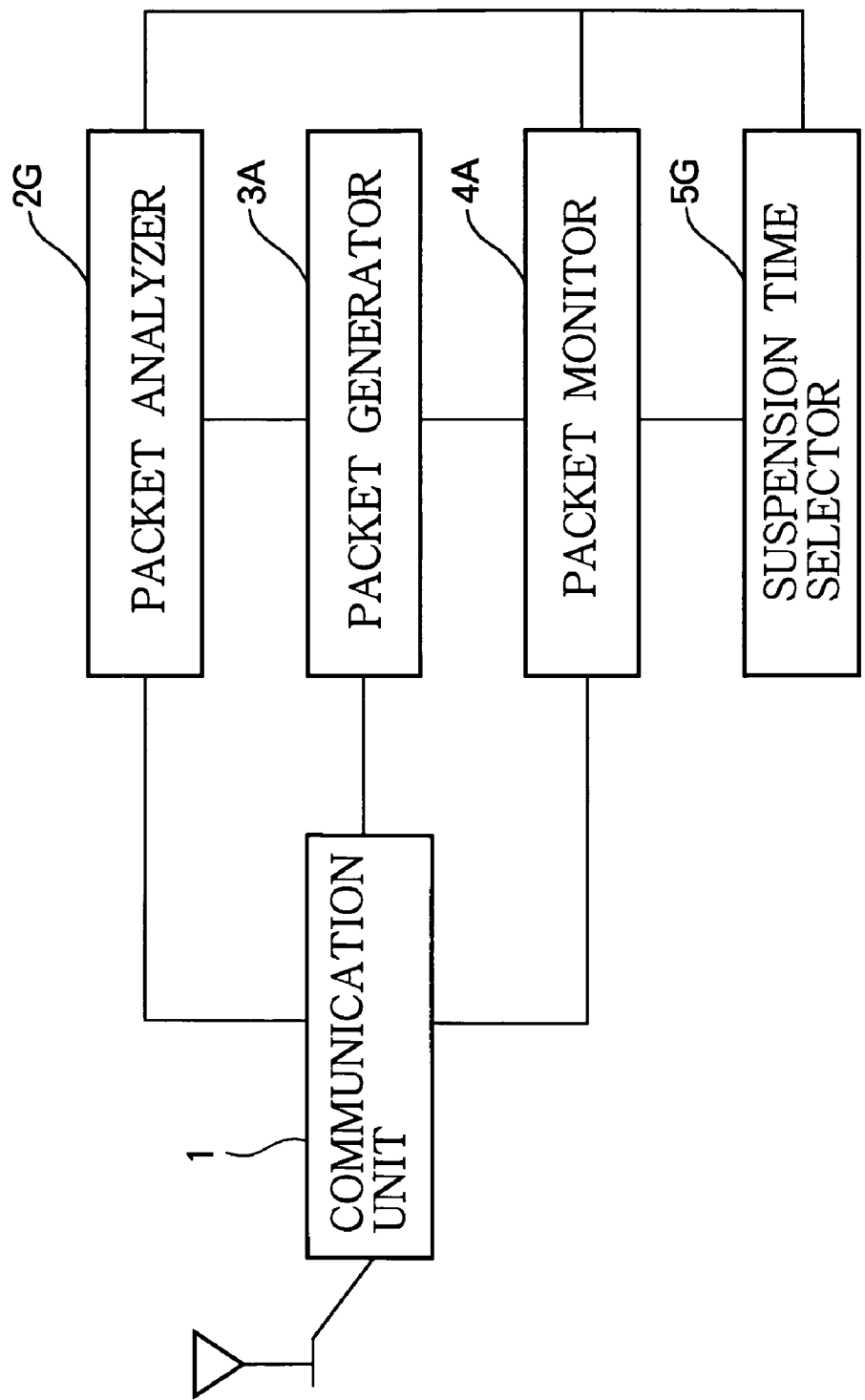

FIG. 41A http://www.ietf.org/rfc/rfc3561.txt

FIG. 41B http://www.cs.sunysb.edu/~samir/Pubs/icnp-01.pdf

COMMUNICATION TERMINAL AND COMMUNICATION NETWORK

BACKGROUND OF THE INVENTION

1. Field of the Invention

The present invention relates to a communication network such as an ad hoc network comprising a plurality of communication terminals, to the terminals in the network, and in particular to the routing method employed in the network.

2. Description of the Related Art

Communication in an ad hoc network takes place by the routing of packets from a source node or terminal to a destination node or terminal on a path that may lead through one or more intermediate or relay nodes or terminals. ('Terminal' will be used below as a synonym for 'node'.) All of the terminals in the network are capable of operating as routers, that is, of designating the paths or routes that packets will follow. The routing methods employed in an ad hoc network include single-path schemes such as the one described in, for example, 'Ad hoc On-Demand Distance Vector (AODV) Routing', available on the Internet as of Oct. 16, 2003 at the URL shown in FIG. 41A, and multipath schemes such as the one described in, for example, 'On-demand Multipath Distance Vector Routing in Ad Hoc Networks', available on the Internet as of Oct. 16, 2003 at the URL shown in FIG. 41B.

Single-path routing schemes are unstable because communication can be broken off if even a single terminal is disabled or moved to another location. Multipath schemes are more stable because if communication breaks down on one path it can be continued without interruption on another path.

Conventional multipath routing schemes, however, invite a further problem. As numerous paths crisscross the network between a source terminal and a destination terminal, neighboring terminals tend to start transmitting packets at identical times, causing the packet signals to interfere or collide. Such interference leads to packet loss and communication delays. This problem becomes especially pronounced when all terminals route packets through a single terminal or a single set of terminals between the source terminal and the destination terminal.

Another problem with conventional multipath schemes is their squandering of network resources when communication conditions are stable.

SUMMARY OF THE INVENTION

An object of the present invention is to provide communication terminals and communication networks that improve on conventional single-path and multipath routing schemes in order to stabilize communication, avoid radio interference, and use network resources effectively.

The invented communication network comprises a plurality of communication terminals, each having means for generating routing information for routing packets from an arbitrary source terminal in the network to an arbitrary destination terminal in the network on both a single-path route and a multipath route. The routing information is placed in packets transmitted to neighboring communication terminals, and analyzed in packets received from neighboring terminals. The single-path route defined by the routing information is separated from the multipath route defined by the routing information so that signals transmitted on the multipath route do not interfere with signals transmitted on the single-path route.

The multipath route may be temporally separated from the single-path route by transmitting packets on the single-path route without delay, and suspending the transmission of packets temporarily at each communication terminal on the multipath route. The suspension time may be determined on the basis of communication signal conditions or packet transmission activity at neighboring or nearby terminals, or on the basis of the number of flows being relayed simultaneously. While a terminal is holding a packet suspended, if the terminal receives an identical packet from another terminal, indicating that the packet has already been relayed by the other terminal, transmission of the suspended packet and the identical packet is preferably canceled.

Alternatively, the multipath route may be spatially separated from the single-path route by using the routing information to designate different zones in the network, the single-path route being disposed in one zone, the multipath route in another zone. These two zones may be defined in terms of numbers of hops from a designated median terminal, the zone including the single-path route being interior to the zone including the multipath route. The zone including the multipath route may be divided into subzones, packet transmission being temporarily suspended for different lengths of time at terminals in different subzones. The single-path route and the multipath route may both be used simultaneously, or just one of the two routes may be used, depending on the stability of communication conditions.

The invention also provides communication terminals for use in the invented communication network.

By providing a substantially interference-free single-path route as well as a multipath backup route, the invention uses network resources effectively to ensure robust and stable communication routing, not disrupted by frequent packet collisions or interference.

BRIEF DESCRIPTION OF THE DRAWINGS

In the attached drawings:

FIGS. 3, 4, 5, 6, 7, 8, 9, 10, 11, 12, 13, 14, 15, 16, 17, 18, 19, 20, 21, 22, 23, and 24 illustrate the routing operation of an ad hoc network according to the first embodiment;

FIG. 29 illustrates the distance vector table in FIG. 28;

FIGS. 32A and 32B are timing diagrams illustrating the routing of a packet in an ad hoc network according to the sixth embodiment;

FIG. 33 is a block diagram of a wireless communication terminal according to a seventh embodiment;

FIGS. 41A and 41B show URLs that have been transferred from the text to the drawings in order to avoid browser-executable code in the specification.

DETAILED DESCRIPTION OF THE INVENTION

Figure 1:
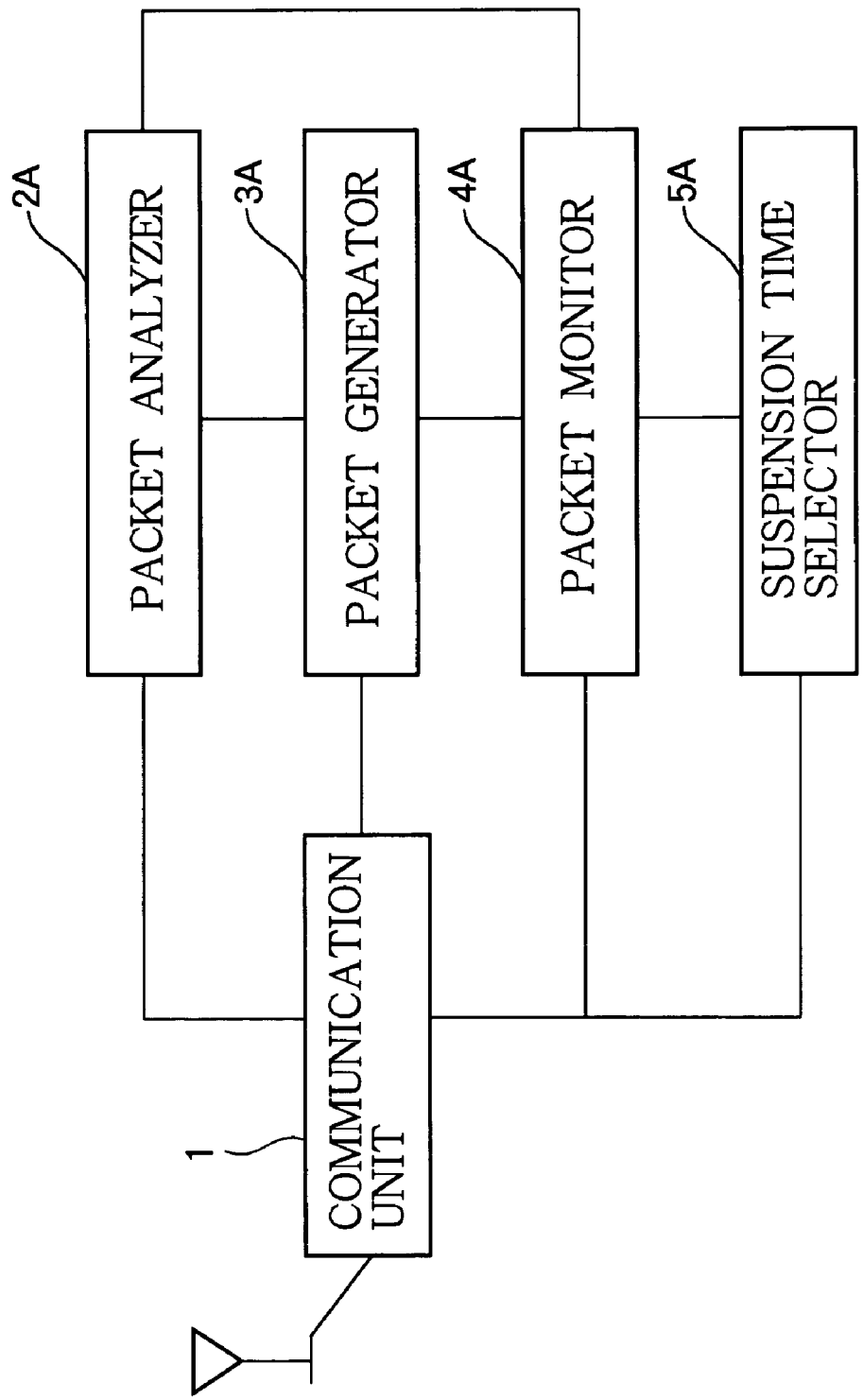
FIG. 1 is a block diagram of a wireless communication terminal according to a first embodiment of the invention.

Embodiments of the invention will now be described with reference to the attached drawings, in which like elements are indicated by like reference characters.

First Embodiment

The first embodiment is based on a source routing scheme in which packets are transmitted with attached information specifying the entire single-path route. When a source terminal communicates with a destination terminal, the routing process includes the following five steps.

Step 1: To confirm the feasibility of communication with the destination terminal, the source terminal floods the network with packets requesting communication with the destination terminal. Each terminal, other than the destination terminal, that receives one of these packets adds its own terminal identifier (ID) and transmits the packet onward. The terminal ID is a communication interface address, an Internet protocol (IP) address, a media access control (MAC) address, or other identifying information stored in the terminal. When the destination terminal receives these packets, it analyzes the added IDs to find the shortest route from the source terminal.

Step 2: When the destination terminal receives one of these packets from the source terminal, it floods the network with acknowledging packets advertising its own presence. Each terminal in the network that receives one of the acknowledging packets adds its own ID and transmits the packet onward. When the source terminal receives these acknowledging packets, it analyzes the added IDs find the shortest path to the destination terminal.

Step 3: After confirming that communication is possible by the transmission and reception of the above flooded packets, and analyzing the added IDs, the source and destination terminals both create path information listing the IDs of the intermediate terminals on the shortest path between them. (The shortest path from the source terminal to the destination terminal is likely to be the reverse of the shortest path from the destination to the source terminal.)

Step 4: The source terminal adds this path information to data packets addressed to the destination terminal and launches the packets onto the network.

Step 5: When a terminal receives a data packet, it decides whether it is on the shortest path to the destination terminal by determining whether or not its own ID is included in the path information. If its own ID is included in the path information, the terminal immediately transmits (relays) the packet; otherwise, it suspends transmission of the packet and waits for a certain suspension time to see if it receives an identical packet from another terminal; if it receives the identical packet from another terminal within the suspension time, it abandons both the suspended packet and the newly received packet; if it does not receive an identical packet within the suspension time, it transmits the suspended packet.

In step 5, receiving the same packet as the suspended packet within the suspension time is taken to indicate that the packet has been relayed by a terminal on the shortest path. If the terminal does not receive the same packet within the suspension time, this is taken to indicate that the packet has not been relayed by another terminal on the shortest path. The shortest path has the highest priority and is used as the main path, for single-path routing; other paths have lower priority and are used as backup paths, on which the packet is transmitted only if transmission on the main path fails.

Referring to FIG. 1, a terminal in the first embodiment comprises a communication unit 1, a packet analyzer 2A, a packet generator 3B, a packet monitor 4A, and a suspension time selector 5A.

The communication unit 1 performs wireless communication with other terminals in the network by transmitting and receiving packets.

The packet analyzer 2A analyzes packets received by the communication unit 1. Depending on the type of packet, the packet analyzer 2A may perform one of the following two processes.

a) By retaining the lists of intermediate IDs attached to packets received with the same source address and analyzing these lists, the packet analyzer 2A finds the shortest path to the terminal having that source address. The packet analyzer 2A generates path information listing the IDs of the intermediate terminals on the shortest path, giving the source address as a destination terminal ID, and sends the path information to the packet generator 3A.

b) When a received packet includes path information, the packet analyzer 2A analyzes the path information, source address, destination address, and packet ID (a sequence number, port number, or other information identifying the packet). The packet analyzer 2A decides whether or not its own terminal ID is included in the path information. If its own terminal ID is included in the path information, the packet analyzer 2A sends the packet to the packet generator 3A for immediate transmission through the communication unit 1. If its own terminal ID is not included, and the ID of any nearby terminal within carrier sensing range of the communication unit 1 is included in the path information, the packet analyzer 2A sends the received packet to the packet monitor 4A, where the packet is held for a suspension time set by the suspension time selector 5A. If no nearby terminal ID is included in the path information, the packet analyzer 2A decides not to transmit the packet to the destination terminal and sends the packet to the packet monitor 4A to be abandoned.

A terminal often has more than one address. In that case, the terminal's own ID information may be stored in a table with a plurality of ID data fields corresponding to different address types, such as MAC address, IP address, and so on. In analyzing the path information, the packet analyzer 2A first determines the type of addresses included in the path information. If the path information consists of MAC addresses, for example, the packet analyzer 2A reads its own MAC address from the table and decides whether or not this MAC address is included in the path information.

The packet generator 3A generates a packet by adding its own terminal ID to a received packet and transmits the generated packet through the communication unit 1. In particular, the packet generator 3A performs the following two processes.

A) The packet generator 3A generates and transmits communication request packets and packets acknowledging received communication request packets.

B) The packet generator 3A adds path information received from the packet analyzer 2A to a generated packet and transmits the packet through the communication unit 1.

The packet monitor 4A holds a packet received from the packet analyzer 2A for a suspension time set by the suspension time selector 5A. If the packet monitor 4A receives the same packet as the suspended packet from the packet analyzer 2A within the suspension time, it decides that the packet has been successfully relayed by another terminal and abandons both the received and the suspended packets. If the set suspension time expires without reception of the same packet, the packet monitor 4A decides that the packet was not successfully relayed by any other terminal, and relays the suspended packet through the communication unit 1.

The suspension time selector 5A sets the suspension time during which the packet monitor 4A holds a packet. The suspension time selector 5A is connected to the communication unit 1 and packet monitor 4A, but not to the packet analyzer 2A. The suspension time selector 5A monitors communication signal conditions by monitoring wireless carrier sensing by the communication unit 1, and sets the suspension time for holding packets accordingly.

The operation of an ad hoc network including terminals of the above type will now be described.

First, the source terminal floods the network with communication request packets to establish wireless communication with the destination terminal. When each terminal in the network receives one of these communication request packets, it adds its own terminal ID to the communication request packet and relays the packet.

When the destination terminal receives a communication request packet originating from the source terminal and recognizes itself as the target of the communication request, it floods the network with acknowledging packets to answer the request. When receiving one of these acknowledging packets, each terminal in the network relays the acknowledging packet, adding its own terminal ID to the packet.

By receiving acknowledging packets originating from the destination terminal, the source terminal determines the shortest path to the destination terminal and the terminal IDs of the terminals on the shortest path. This completes the preparatory stage that establishes the feasibility of wireless communication between the source and destination terminals.

Having recognized the shortest path and the terminal IDs on the shortest path in this preparatory stage, the source terminal has its packet generator 3A add the terminal IDs on the shortest path as path information to packets to be transmitted to the destination terminal, and transmits these packets through the communication unit 1.

Figure 2:
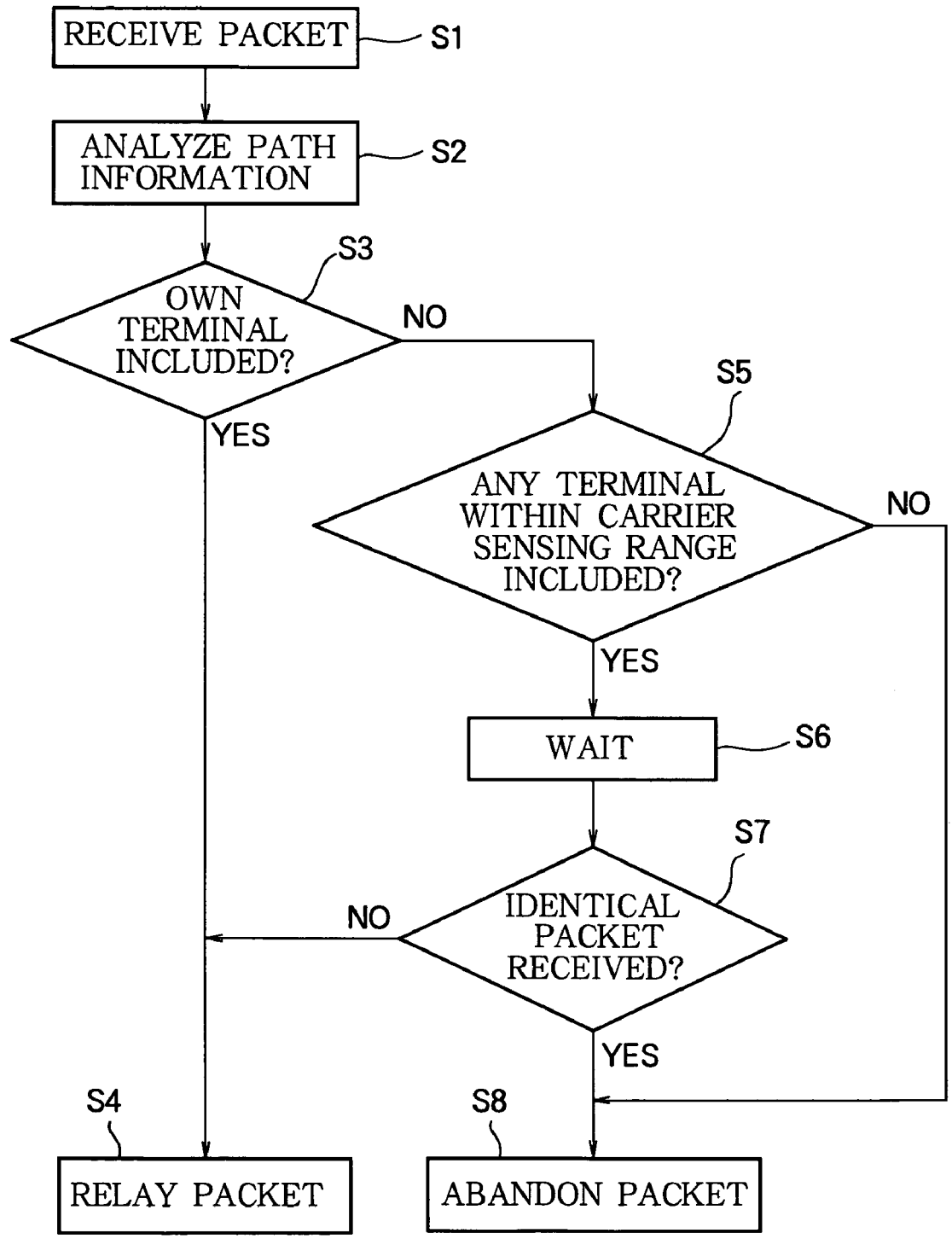
FIG. 2 is a flowchart illustrating the routing procedure in the first embodiment.

Referring to FIG. 2, when an intermediate terminal (any terminal other than the source and destination terminals) receives a packet to which this path information has been added (step S1), the packet analyzer 2A in the intermediate terminal analyzes the path information (step S2) and decides whether or not its own terminal ID is included in the path information (step S3). If the terminal's own ID is included in the path information, the packet analyzer 2A immediately transmits the packet through the communication unit 1 (step S4).

If the terminal's own ID is not included in the path information, the packet analyzer 2A decides whether or not the ID of any nearby terminal within carrier sensing range of the communication unit 1 is included in the path information (step S5). After making this decision, the packet analyzer 2A then passes the received packet to the packet monitor 4A, which takes action according to the decision by the packet analyzer 2A.

If the path information does not include the ID of any nearby terminal within carrier sensing range, the packet monitor 4A abandons the packet (step S8) This step restricts the multipath backup route to terminals within carrier sensing range of the single-path main route, so that the packet does not flood the entire network.

If the ID of a nearby terminal within carrier sensing range of the communication unit 1 is included in the path information, then when the packet monitor 4A receives the packet from the packet analyzer 2A, it decides whether or not it is already holding a packet identical to the received packet; if it does not hold an identical packet, it retains the received packet until a suspension time set by the suspension time selector 5A expires (step S6).

If while holding the received packet, the packet monitor 4A receives an identical packet from the communication unit 1 through the packet analyzer 2A within the suspension time, it recognizes that the packet was successfully relayed by a neighboring terminal (step S7), and abandons both the received packet it is already holding and the identical newly received packet (step S8).

If the suspension time expires before the packet monitor 4A receives an identical packet, the packet monitor 4A decides that the packet was not successfully relayed by any neighboring terminal and relays the received packet itself through the communication unit 1.

The decision as to whether or not the received packet is identical to the packet, which the packet analyzer 2A is already holding, may be made by inspecting the packet ID. That is, in passing a received packet to the packet monitor 4A, the packet analyzer 2A may supply the packet ID obtained by analysis of the packet to the packet monitor 4A, which compares the received packet ID with the packet ID of the packets (if any) that it is already holding. The source and destination addresses, as well as the packet ID, may be inspected in this way.

The suspension time selector 5A sets the suspension time according to the communication signal conditions of nearby terminals as indicated by the sensing of their carrier signals. The terminals monitored include both adjacent terminals to which the terminal may relay packets, and more distant terminals, such as terminals on the opposite side of the shortest path, which, like the terminal itself, may act as relay terminals on backup paths. If, for example, the carrier signals of these nearby terminals are detected only infrequently, indicating that the terminals are inactive (not communicating), the suspension time selector 5A sets a relatively short suspension time; if the carrier signals of the nearby terminals are sensed frequently, indicating that they are transmitting packets frequently, the suspension time selector 5A sets a relatively long suspension time.

Alternatively, the suspension time selector 5A may set the suspension time according to a predetermined algorithm. The suspension time selector 5A may also be adapted to select an optimal method of setting the suspension time from among a plurality of methods, the optimal method being the method that makes optimal use of terminal resources and network resources. For example, the suspension time selector 5A may be able to choose between setting the suspension time by monitoring the carrier signal activity of nearby terminals and setting the suspension time according to an algorithm.

The operation of the first embodiment will now be further described with reference to FIGS. 3 to 24, in which terminals 'a' to 'g' are intermediate terminals disposed generally between the source and destination terminals (not shown). Terminals 'a', 'b', and 'e' are on the shortest path (the highest-priority path) from the source terminal to the destination terminal; terminals 'c', 'd', 'f', and 'g' form parts of backup paths with lower priority. FIGS. 3 to 7 show the operation of each terminal when a packet is successfully relayed on the shortest path.

Figure 3:
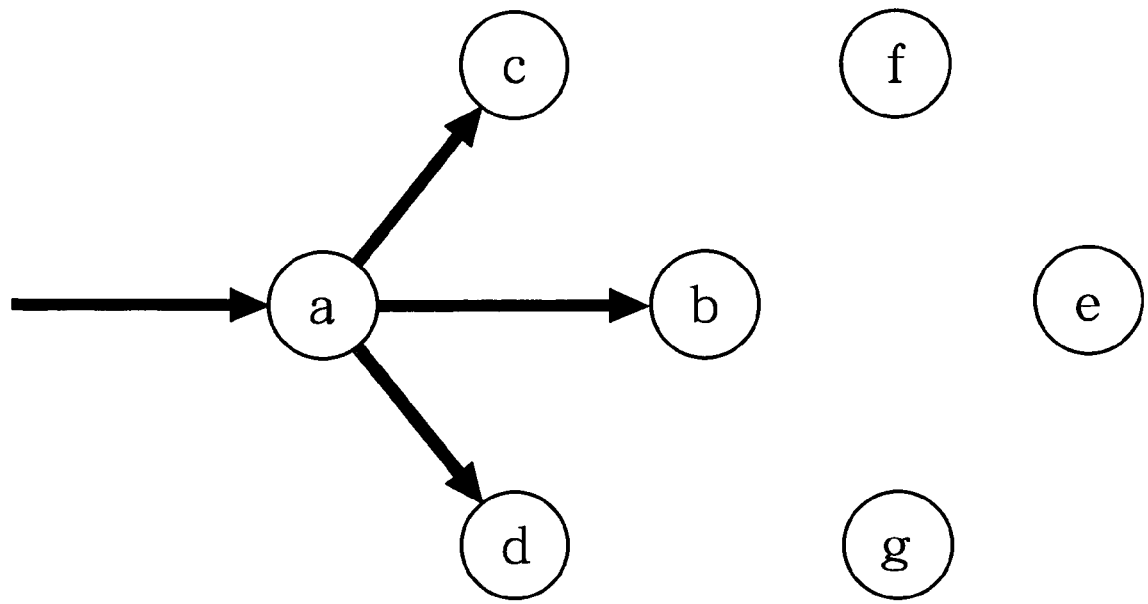

Referring to FIG. 3, when terminal 'a' receives a packet, because it is on the shortest path, it immediately relays the received packet to terminals 'b', 'c', and 'd'.

Figure 4:
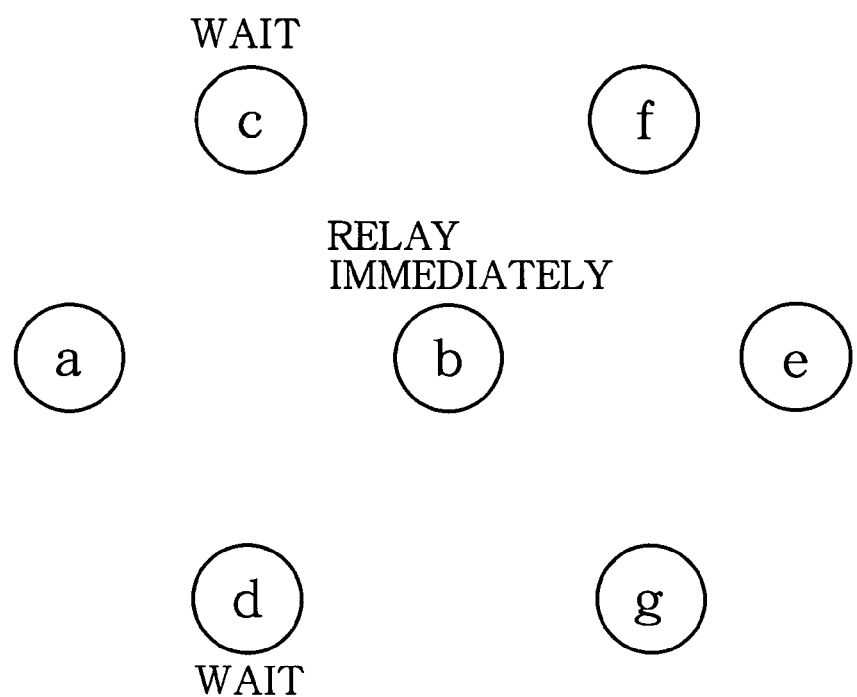

Next, referring to FIG. 4, after receiving the packet from terminal 'a', terminal 'b' recognizes that it is on the shortest path and immediately relays the received packet. Terminals 'c' and 'd' recognize that they are on paths with lower priority, and suspend the received packet for the designated suspension time, waiting to see whether or not the packet is successfully relayed by another terminal, such as a terminal on the shortest path.

Figure 5:
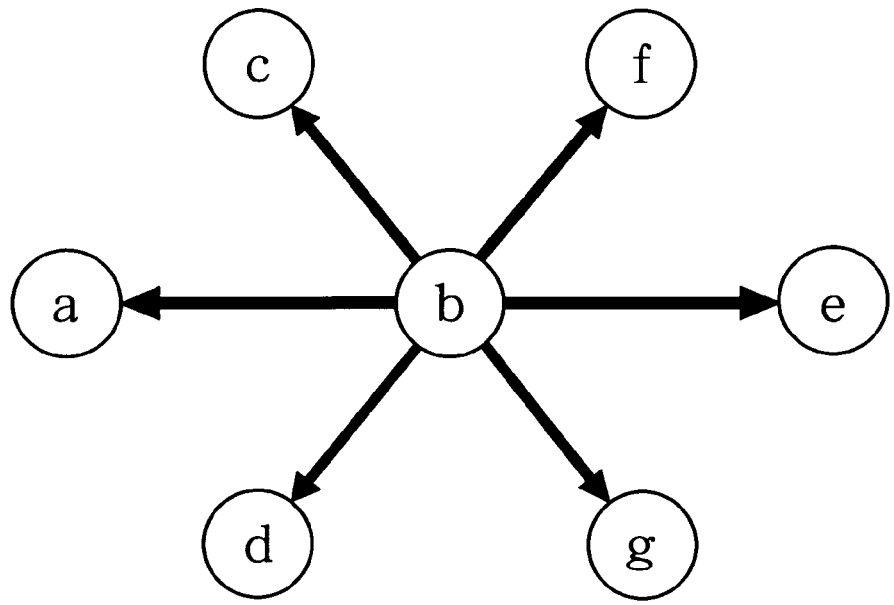

Referring to FIG. 5, terminal 'b' immediately relays the packet received from terminal 'a'. The packet is now received by terminals 'c', 'd', 'e', 'f', and 'g'

Figure 6:
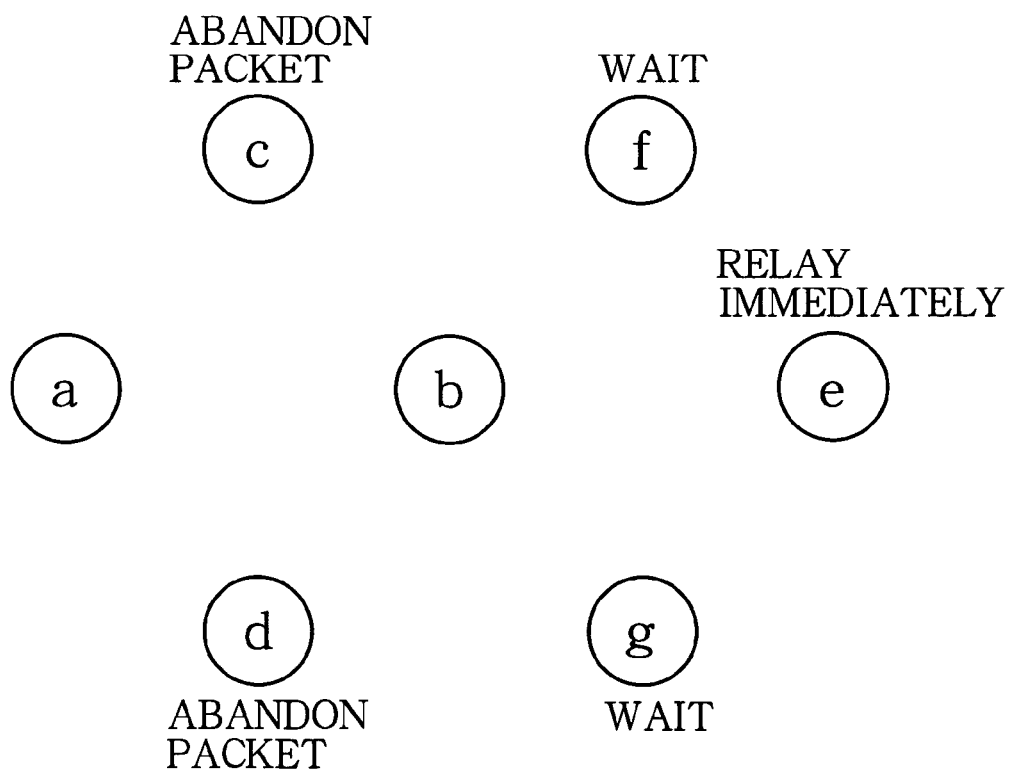

Referring to FIG. 6, upon receiving this packet, which is identical to the packet they are holding in suspension, terminals 'c' and 'd' recognize that the packet has been successfully relayed (in fact, the packet has been relayed on the shortest path) and abandon both the packet being held and the identical packet received from terminal 'b'. Terminal 'e' recognizes itself as being on the shortest path and immediately relays the packet received from terminal 'b'; terminals 'f' and 'g' recognize that they are on paths with lower priorities, and suspend the packet received from terminal 'b' for the designated suspension time, waiting to see whether or not the packet is successfully relayed by another terminal.

Figure 7:
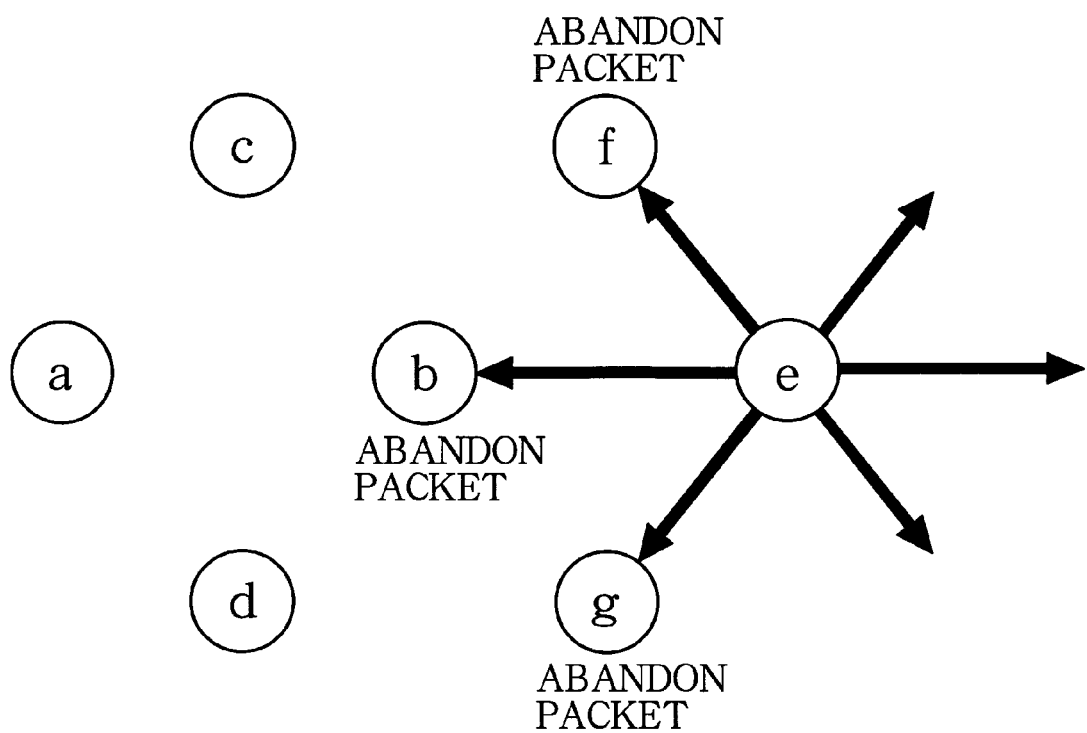

Referring to FIG. 7, the packet relayed by terminal 'e' is received by terminals 'f' and 'g'. Because the received packet is identical to the packet that they received from terminal 'b' and are holding suspended, terminals 'f' and 'g' recognize that the packet has been successfully relayed and abandon both the suspended packet and the identical packet received from terminal 'e'.

FIGS. 8 to 14 show terminal operations when a packet cannot be successfully relayed by terminal 'b' on the shortest path.

Figure 8:
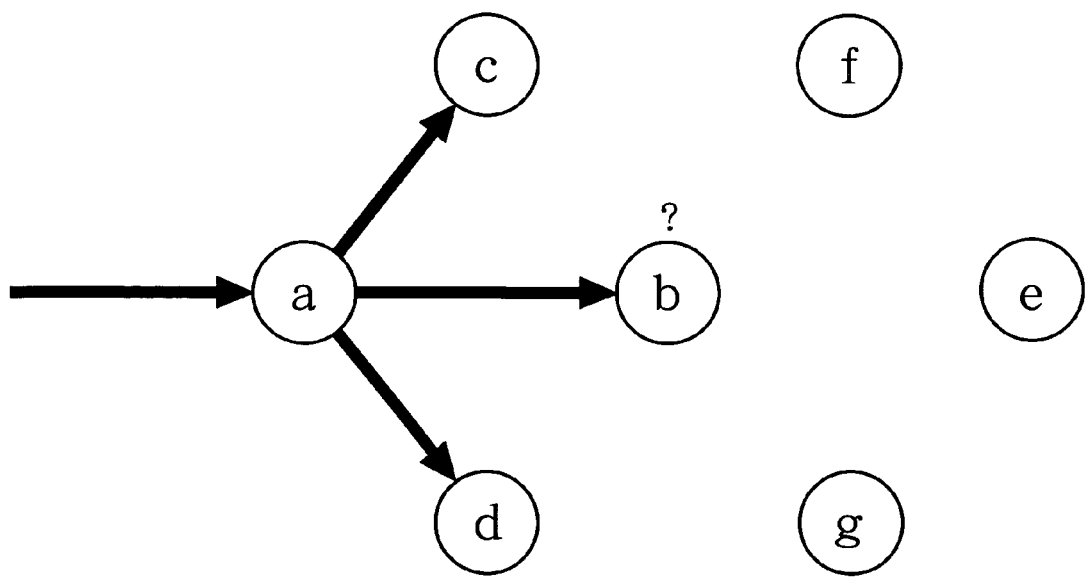

Referring to FIG. 8, when terminal 'a' receives the packet, it recognizes itself as being on the shortest path and immediately relays the received packet. The relayed packet is received by terminals 'c' and 'd', and possibly by terminal 'b'.

Figure 9:
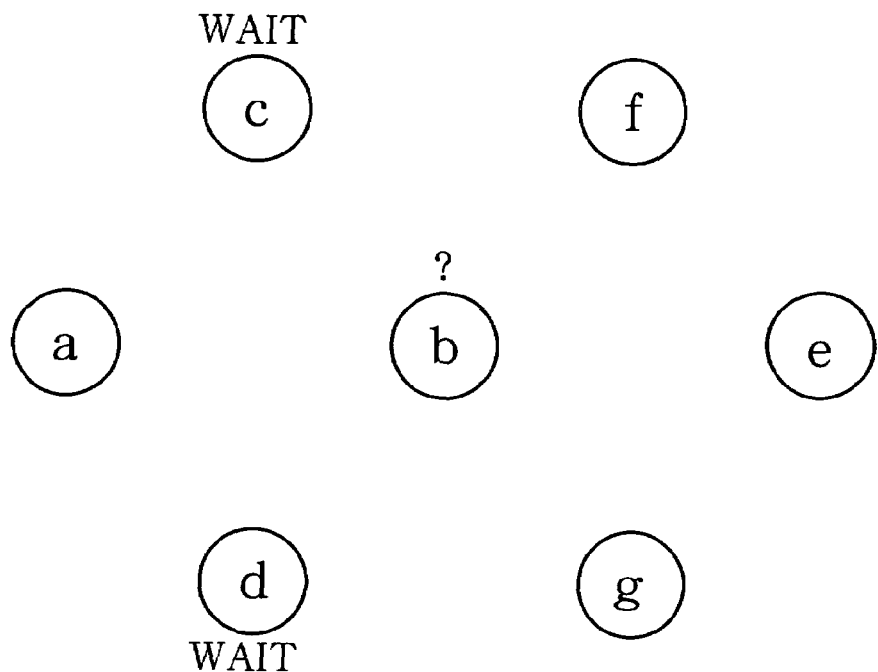

Referring to FIG. 9, upon receiving the packet relayed from terminal 'a', terminals 'c' and 'd' recognize that they are on paths with lower priority than the shortest path and suspend the received packet for a certain period of time, waiting to see whether or not the packet is successfully relayed by another terminal. It will be assumed below that the suspension time set at terminal 'd' is shorter than the suspension time set at terminal 'c'. Terminal 'b', if it receives the packet, may recognize itself as being on the shortest path, but does not relay the received packet, because of a low battery, data corruption, or some other problem. Terminal 'b' may also have been moved to another location where it is unable to receive the packet.

Figure 10:
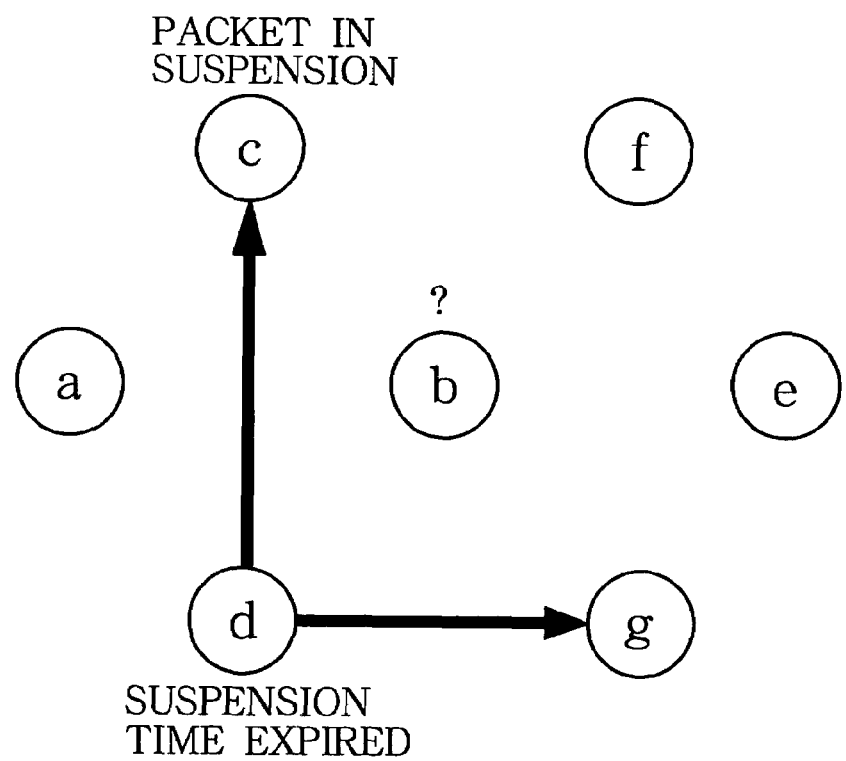

Referring to FIG. 10, because terminal 'b' does not relay the packet, the suspension time at terminal 'd' expires without reception of a packet identical to the suspended packet. Terminal 'd' decides that the packet has not been successfully relayed and relays the suspended packet itself to terminals 'c' and 'g'.

Figure 11:
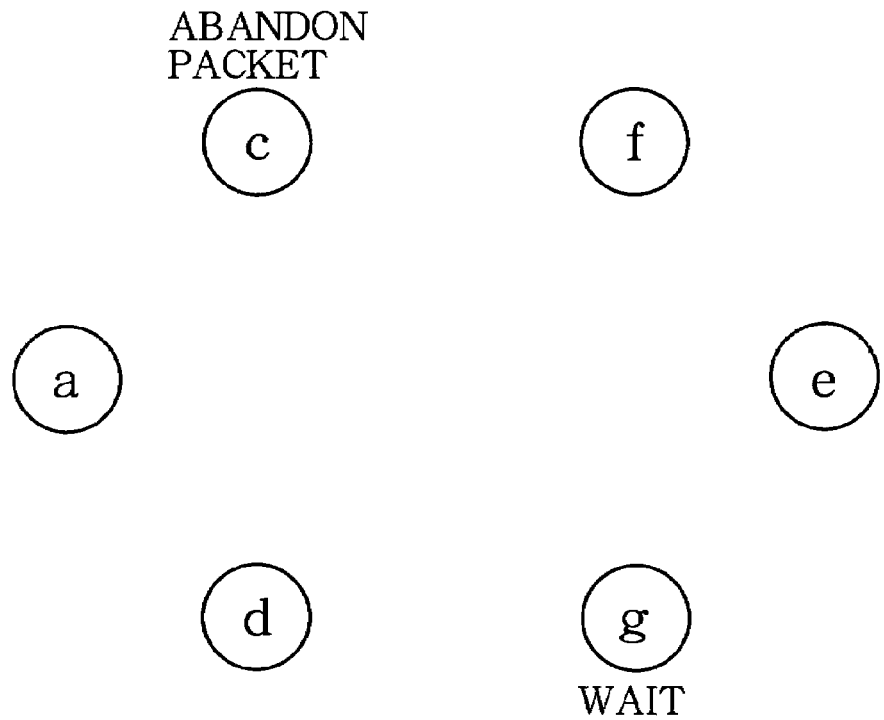

Referring to FIG. 11, when terminal 'c' receives this packet, which is identical to the packet that it received from terminal 'a' and is holding suspended, it decides that the packet has been successfully relayed and abandons both this packet and the suspended packet. When terminal 'g' receives the packet from terminal 'd', it recognizes itself as being on a path with lower priority than the shortest path and suspends the received packet for the designated suspension time, waiting to see whether or not another terminal relays the packet.

Figure 12:
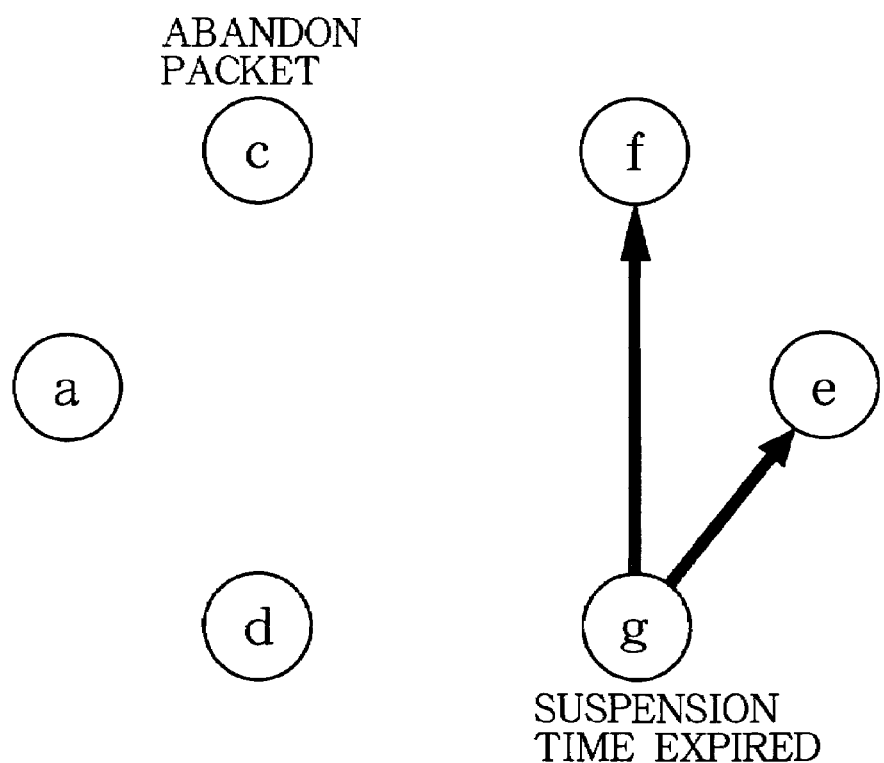

Referring to FIG. 12, after the suspension time expires without reception of a packet identical to the suspended packet, terminal 'g' decides that the packet was not successfully relayed by another terminal and relays the suspended packet itself. The packet is now received by terminals 'e' and 'f'.

Figure 13:
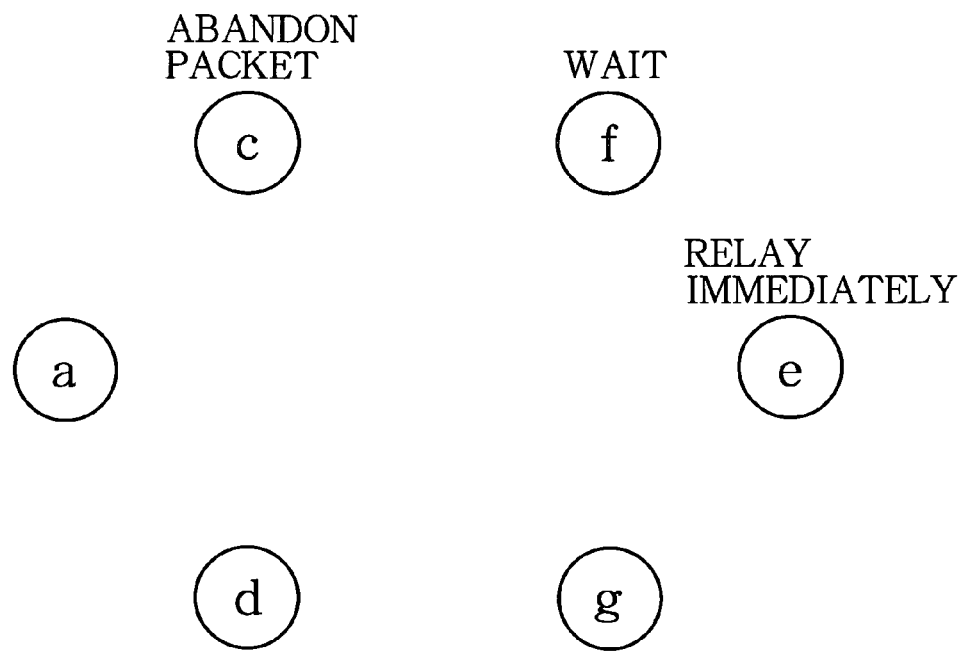

Referring to FIG. 13, upon receiving the packet from terminal 'g', terminal 'e' recognizes that it is on the shortest path and immediately relays the received packet, but terminal 'f' recognizes that it is on a path with lower priority, and suspends the received packet for a certain period of time, waiting to see whether or not the packet is successfully relayed by another terminal.

Figure 14:
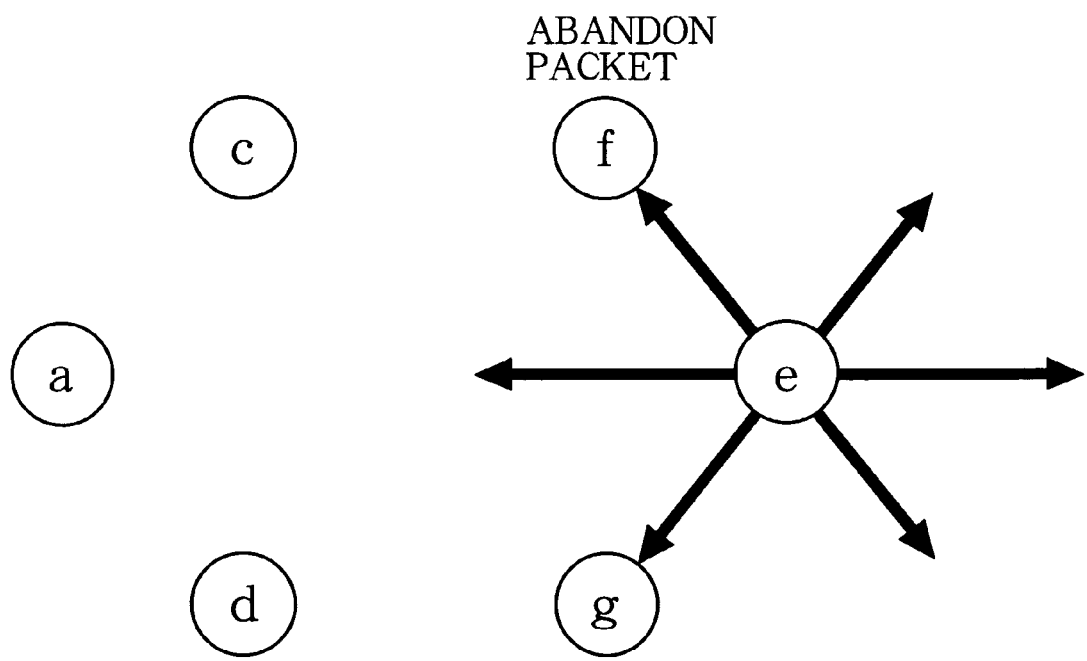

Referring to FIG. 14, terminal 'e' immediately relays the packet received from terminal 'g' to terminal 'f' (and other nearby terminals, some not shown). When terminal 'f' receives this packet, which is identical to the packet it received from terminal 'g' and is holding suspended, it recognizes that the packet has already been successfully relayed and abandons both the suspended packet and the identical packet received from terminal 'e'.

FIGS. 15 to 19 show subsequent terminal-operations when terminal 'b' cannot relay a packet received from terminal 'a' and terminals 'c' and 'd' are out of communication range with each other.

In FIG. 15, terminals 'c' and 'd' hold the packet received from terminal 'a' suspended, waiting for it to be relayed on the main path by terminal 'b', but terminal 'b' cannot relay the packet because of some problem, or because of having been moved out of reception range of terminal 'a'. If terminals 'c' and 'd' do not receive a packet identical to the packet they are holding suspended within the suspension time, they decide that the packet has not been successfully relayed and relay the suspended packets to terminals 'f' and 'g', respectively.

Next, referring to FIG. 16, upon reception of the packet from terminal 'c', terminal 'f' recognizes itself as being on a path with lower priority than the shortest path, and suspends the received packet for a certain period of time, waiting to see whether or not the packet is successfully relayed by another terminal. Similarly, when terminal 'g' receives the packet from terminal 'd', it recognizes itself as being on a path with lower priority than the shortest path, and suspends the received packet for a certain period of time, waiting to see whether or not the packet is successfully relayed by another terminal.

Figure 17:
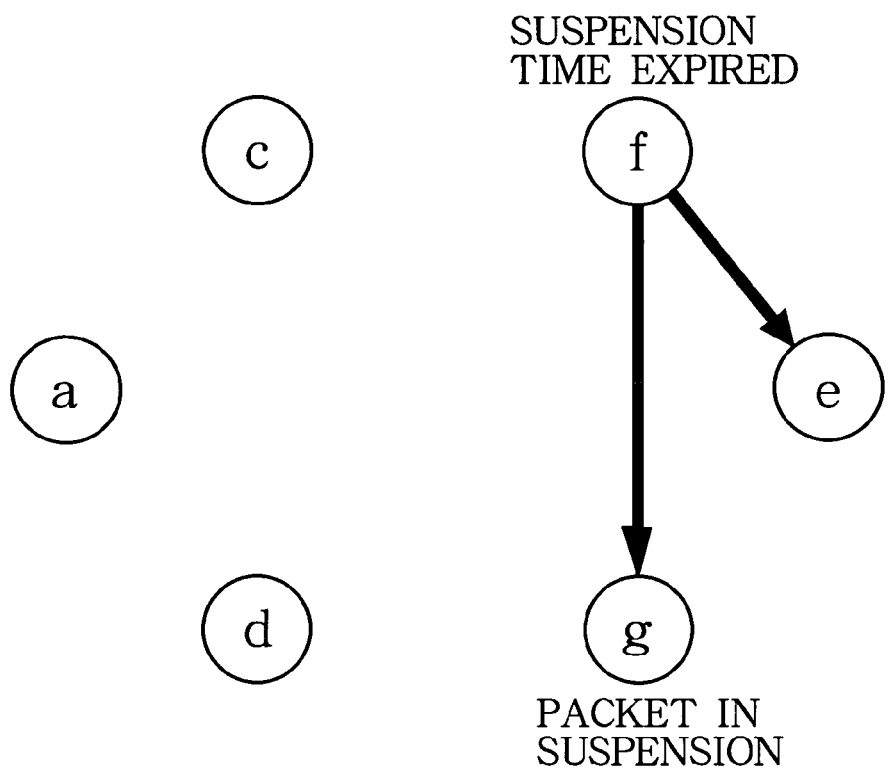

Then, referring to FIG. 17, when the suspension time of the packet expires without reception of a packet identical to the packet it is holding suspended, terminal 'f' decides that the identical packet has not been successfully relayed by another terminal and relays the suspended packet itself to terminals 'e' and 'g'.

Figure 18:
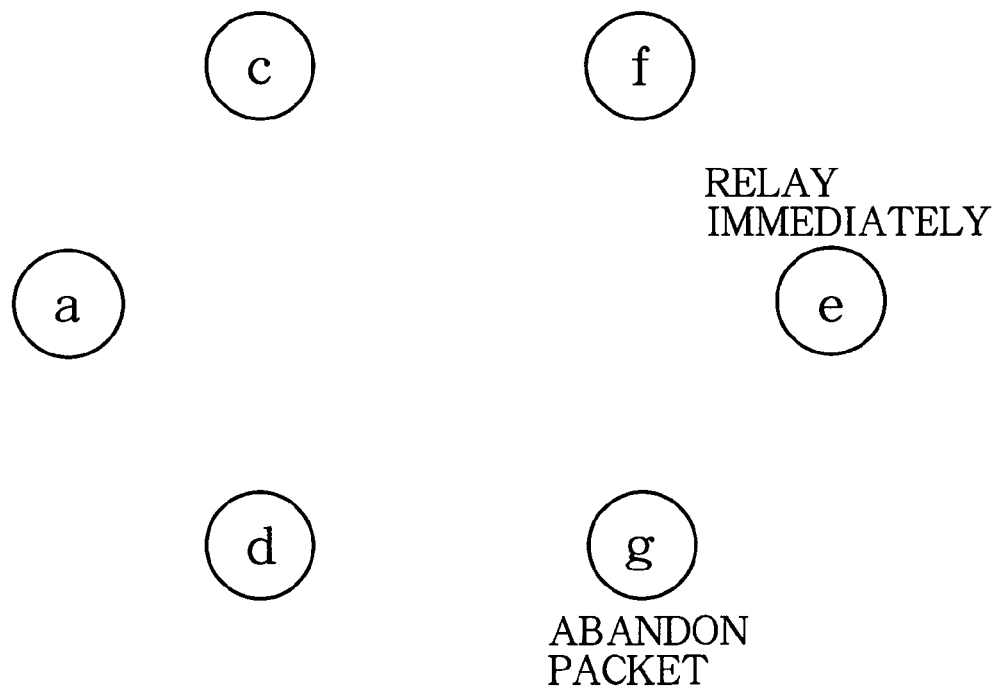
Figure 19:
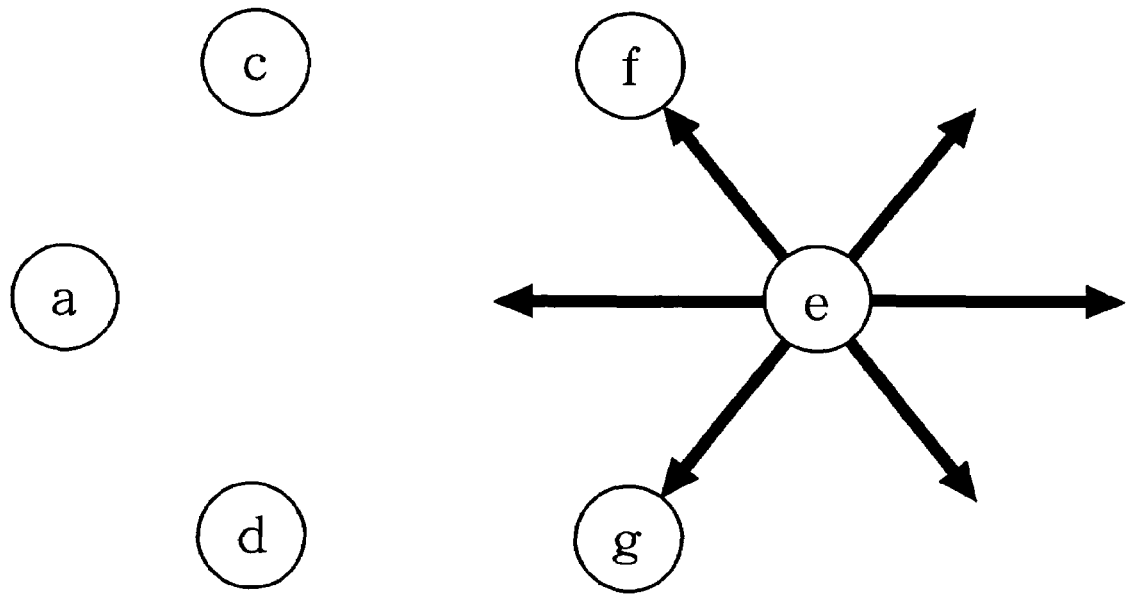

In FIG. 18, since terminal 'g' has received from terminal 'f' a packet identical to the packet that it received from terminal 'd' and is holding suspended, it decides that the packet has been successfully relayed by another terminal and abandons both the suspended packet and the identical packet received from terminal 'f'. Terminal 'e', upon reception of the packet from terminal 'f', recognizes itself as being on the shortest path and immediately relays the received packet as shown in FIG. 19.

FIGS. 20 to 24 show terminal operations when terminal 'b' recovers from the problem shown in FIGS. 8 and 9.

Figure 20:
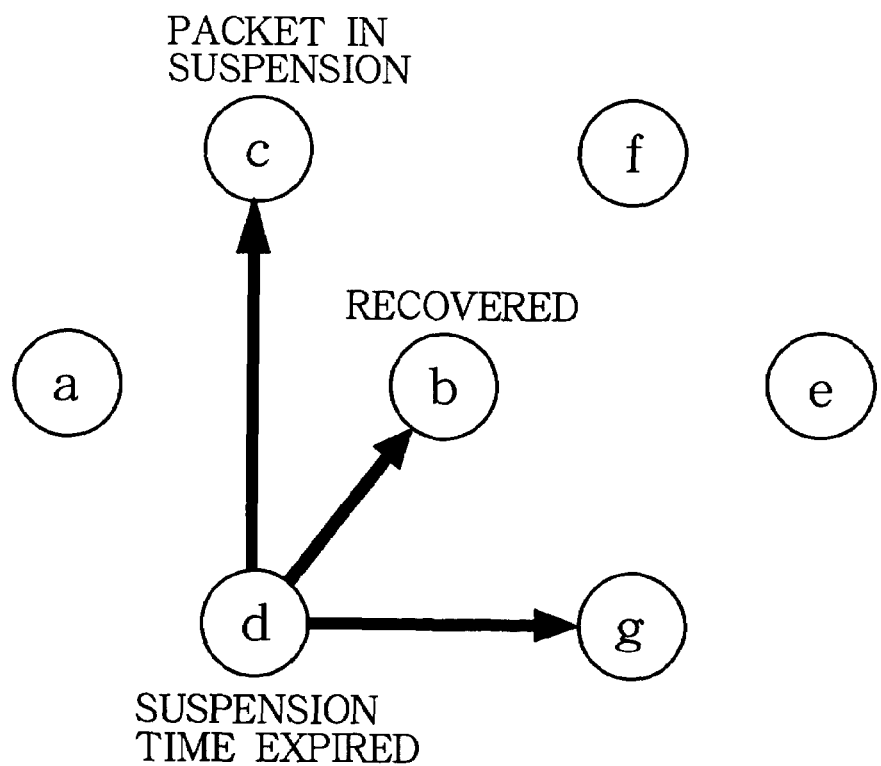

In FIG. 20, terminal 'b' becomes operable again before the suspension time at either terminal 'c' or terminal 'd' expires. Terminal 'd' does not receive a packet identical to the packet it is holding suspended within the suspension time (which is shorter than the suspension time at terminal 'c'), so terminal 'd' decides that the packet has not been successfully relayed by another terminal and relays the suspended packet itself. The packet relayed by terminal 'd' is received by terminals 'c' and 'g' and the recovered terminal 'b'.

Figure 21:
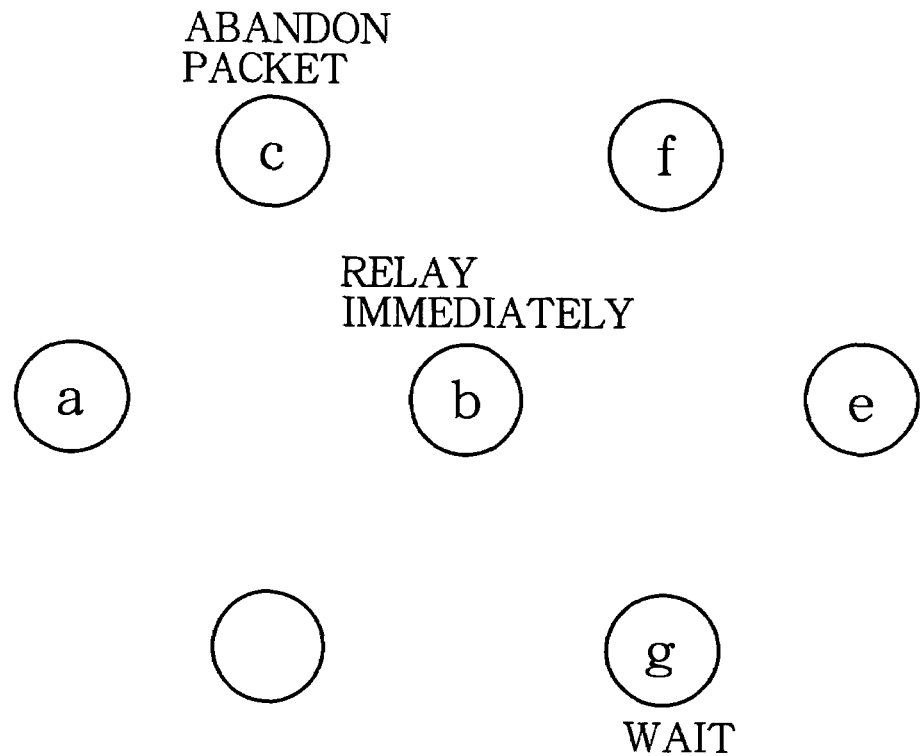
Figure 22:
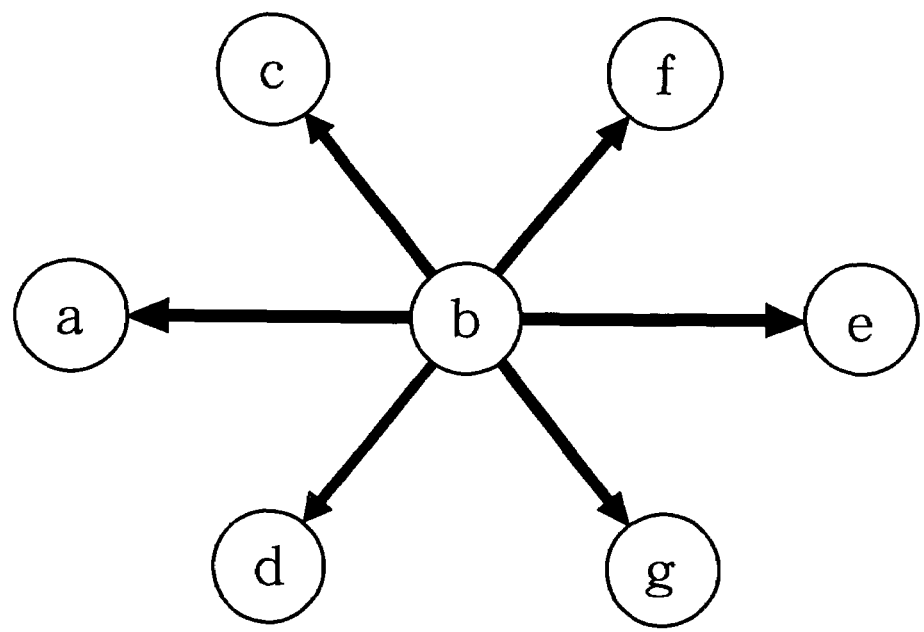

Next, referring to FIG. 21, since terminal 'c' has received a packet identical to the packet that it received from terminal 'a' and is holding suspended, it recognizes that the packet has been successfully relayed by another terminal and abandons both the suspended packet and the received identical packet. Terminal 'g', upon reception of the packet from terminal 'd', recognizes that it is on a path with lower priority than the shortest path, and suspends the received packet for a certain period of time, waiting to see whether or not the packet is successfully relayed by another terminal. When the recovered terminal 'b' receives the packet from terminal 'd', however, it recognizes itself as being on the shortest path, and immediately relays the received packet as shown in FIG. 22. The relayed packet is now received by terminals 'e', 'f', and 'g' (and by-terminals 'a', 'c', and 'd', but only the operations at terminals 'e', 'f', and 'g' will be described below).

Figure 23:
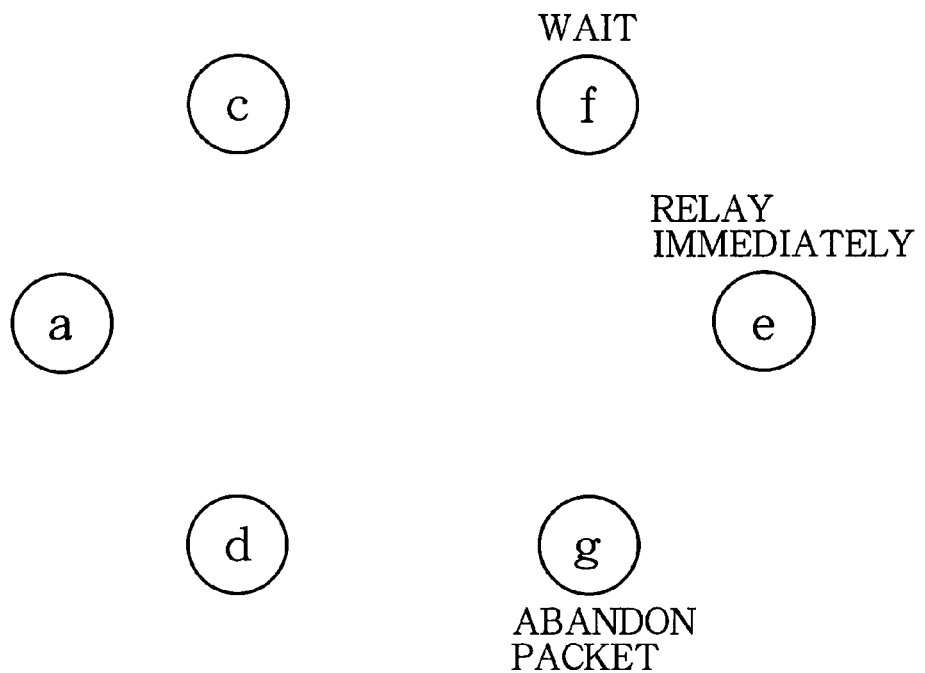

Referring to FIG. 23, since terminal 'g' has received a packet identical to the packet that it received from terminal 'd' and is holding suspended, it recognizes that the packet has been successfully relayed by another terminal and abandons both the suspended packet and the newly received identical packet. Upon reception of the packet from terminal 'b', terminal 'e' recognizes itself as being on the shortest path and immediately relays the received packet; terminal 'f' recognizes itself as being on a path with lower priority than the shortest path, and suspends the received packet for a certain period of time, waiting to see whether or not the same packet is successfully relayed by another terminal.

Figure 24:
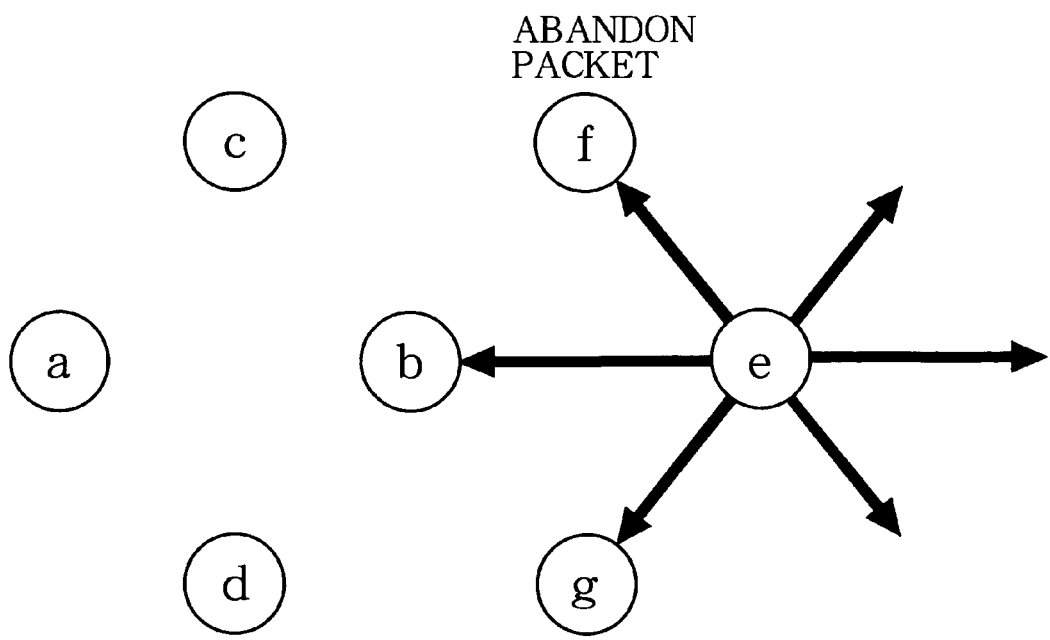

Referring to FIG. 24, terminal 'e' immediately relays the packet received from terminal 'b'. This relayed packet is now received by terminal 'f'. When terminal 'f' receives a packet identical to the packet that it received from terminal 'b' and is holding suspended, it decides that the packet has been successfully relayed by another terminal and abandons both the suspended packet and the identical packet received from terminal 'e'.

As described above, in the first embodiment, path information (listing the terminals on the shortest path) is added to a packet sent from the source terminal; if included in the shortest path, a terminal immediately relays a received packet; otherwise, it suspends the received packet and waits to see whether or not the same packet is relayed successfully by another terminal; after waiting for a certain time, if it has not seen that the packet has been successfully relayed by another terminal, it relays the suspended packet itself. This scheme provides a plurality of wireless communication paths with both space and time diversity: a single main path passing through intermediate terminals with IDs included in the path information, and backup paths passing through one or more intermediate terminals with IDs not included in the path information, the backup paths being used only when the main path fails. Besides providing more stable communication than purely single-path routing schemes, the first embodiment reduces the occurrence of interference among nearby terminals, thereby preventing packet loss and delay, and enables effective use to be made of network resources.

In addition, the first embodiment employs the suspension time selector 5A to set different suspension times, depending on communication conditions at terminals with IDs included in the path information (the terminals on the shortest path) and nearby terminals on backup paths. Consequently, terminals on different backup paths tend to delay packets for different periods of time, so that when the shortest path is disabled and backup paths must be used, the probability that two nearby terminals on different paths will transmit packets simultaneously is reduced, thereby reducing the probability of packet collisions and interference and the resulting packet loss or delay.

Second Embodiment

Figure 25:
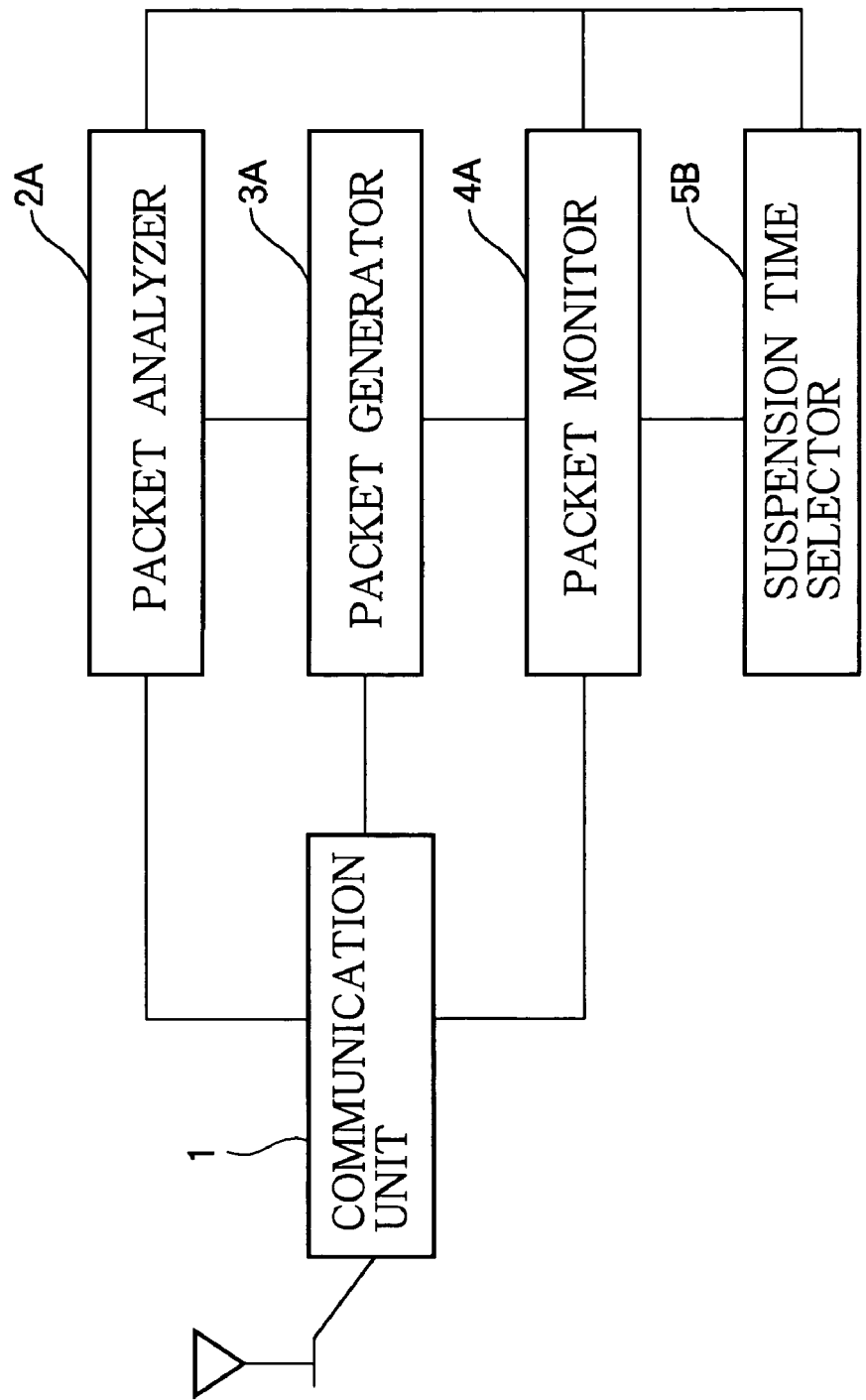
FIG. 25 is a block diagram of a wireless communication terminal according to a second embodiment of the invention.

Referring to FIG. 25, a terminal in a second embodiment comprises a communication unit 1, a packet analyzer 2A, a packet generator 3A, a packet monitor 4A, and a suspension time selector 5B. The terminal structure is the same as in the first embodiment, except that a different suspension time selector 5B is employed. Only the function of the suspension time selector 5B will be described below.

Like the suspension time selector 5A in the first embodiment, the suspension time selector 5B sets the suspension time during which the packet monitor 4A retains a suspended packet. The suspension time selector 5B differs from the packet monitor 4B in that it is interconnected to the packet analyzer 2A, but not to the communication unit 1. The suspension time selector 5B uses the information provided by the packet analyzer 2A to monitor the transmission and reception of packets on the shortest path, and sets the suspension time for holding packets accordingly.

More specifically, the suspension time selector 5B monitors the activity of neighboring terminals listed in the path information extracted from packets by the packet analyzer 2A, and sets the suspension time according to the regularity of their activity, as indicated by the regularity with which the packet analyzer 2A analyzes packets received from those neighboring terminals. For example, if just two neighboring terminals have IDs included in the path information and both of those terminals are transmitting packets regularly, the suspension time selector 5B sets a relatively long suspension time; if either of the two terminals is transmitting packets only irregularly, or not at all, the packet analyzer 2B sets a relatively short suspension time.

Alternatively, the suspension time selector 5B may set the suspension time according to a predetermined algorithm. The suspension time selector 5B may also be adapted to select an optimal method of setting the suspension time from among a plurality of methods, the optimal method being the method that makes optimal use of terminal resources and network resources. For example, the suspension time selector 5B may be able to choose between setting the suspension time by monitoring the communication activity of neighboring terminals and setting the suspension time according to an algorithm.

In the second embodiment, as described above, a terminal constantly monitors the communication activities of neighboring terminals with IDs included in the path information in the packets it receives, and shortens the packet suspension time when any one of these terminals appears to be experiencing a problem, as indicated by irregular or non-existent packet transmission. As a result, when a problem occurs on the path specified in the path information, backup paths are brought into use quickly and the recovery time is shortened.

Third Embodiment

Figure 26:
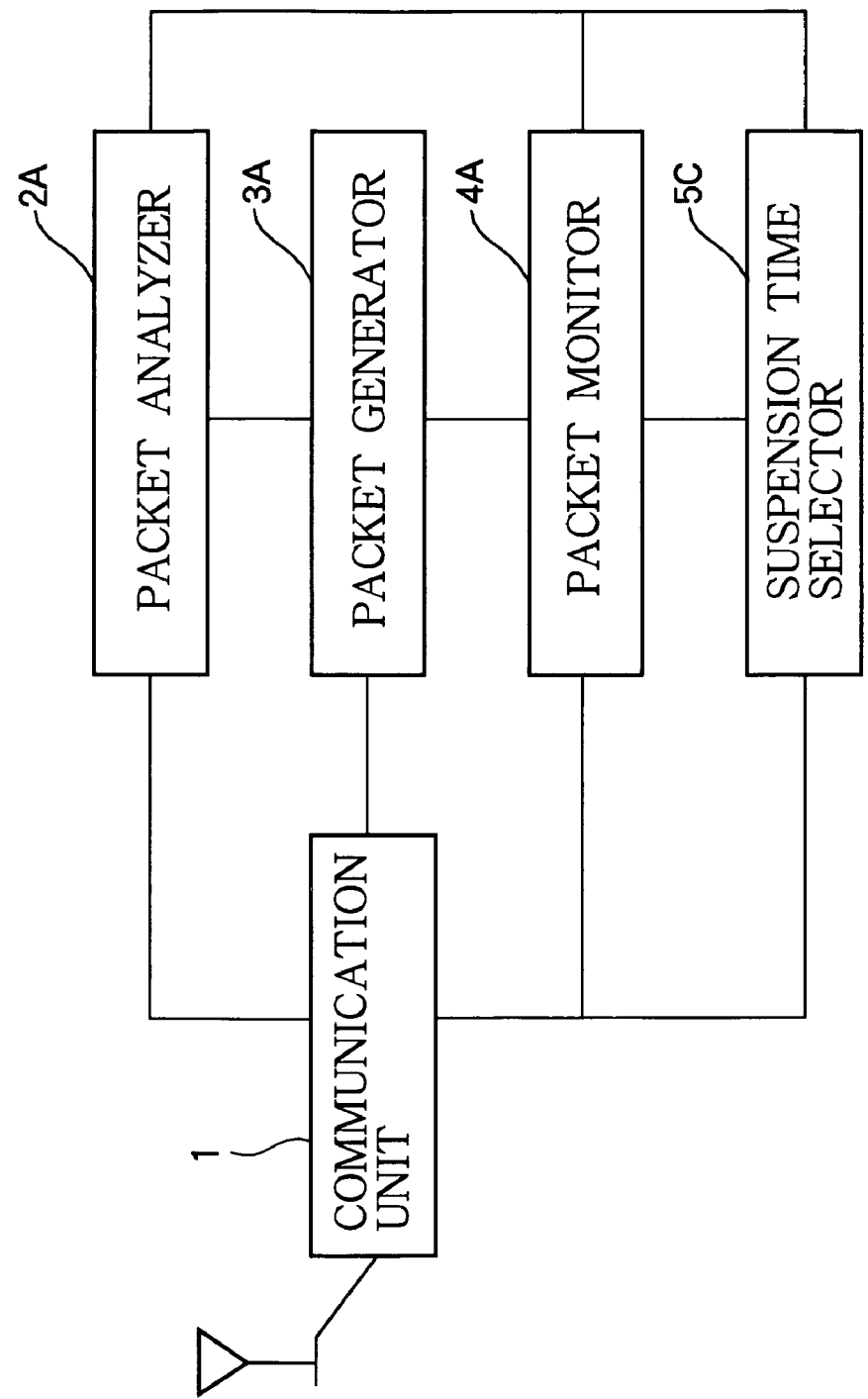
FIG. 26 is a block diagram of a wireless communication terminal according to a third embodiment.

Referring to FIG. 26, a terminal in the third embodiment comprises a communication unit 1, a packet analyzer 2A, a packet generator 3A, a packet monitor 4A, and a suspension time selector 5C. The terminal structure is the same as in the first embodiment except for the use of a different suspension time selector 5C, so only the functions of the suspension time selector 5C will be described below.

Like the suspension time selector 5A in the first embodiment, the suspension time selector 5C sets the suspension time during which the packet monitor 4A holds a packet. The suspension time selector 5C differs from the suspension time selector 5A in that it is interconnected to the packet analyzer 2A as well as to the communication unit 1, and monitors both the carrier signal conditions and the packet transmission activity of nearby terminals in order to set the suspension time for holding packets.

The suspension time selector 5C sets the suspension time according to the methods used in both the first and second embodiments. That is, it monitors the communication activity of nearby terminals as indicated by the sensing of the carrier signals of terminals in a range wider than the range of terminals with which the terminal communicates. It also monitors the activity of neighboring terminals listed in the path information extracted from packets by the packet analyzer 2A, to determine whether they are transmitting packets regularly. The suspension time is set according to the conditions and activity of both sets of terminals.

The suspension time selector 5A in the first embodiment cannot judge the communication activity of the terminals listed in the path information, so it cannot take steps to shorten the recovery time when a terminal on the shortest path fails. The suspension time selector 5B in the second embodiment cannot judge the conditions of terminals not on the shortest path, so it cannot take steps to shorten the recovery time when a geographically accessible terminal not on the shortest path fails, or to reduce the probability that packets transmitted on two backup paths will collide.

The suspension time selector 5C in the third embodiment can judge the conditions and activity of both terminals on and off the shortest path, so besides shortening recovery time when a problem occurs on the shortest path, it can take steps to shorten the recovery time if a terminal on a backup path fails during use of the backup path, and can take further steps to reduce the probability that two terminals will start backup transmission simultaneously and that their transmitted packets will collide. In regard to this last point, it is significant that terminals on different backup paths will tend to set different suspension times, because they judge the conditions of different sets of nearby terminals. In addition, the terminals on different backup paths can coordinate their transmission timings so as to reduce the probability of collision to substantially zero.

Like the suspension time selector 5A in the first embodiment, the suspension time selector 5C may set the suspension time according to the carrier signal conditions of nearby terminals in a range wider than the range of terminals with which the terminal communicates. Like the suspension time selector 5B in the second embodiment, the suspension time selector 5C may set the suspension time according to the communication activity of nearby terminals on the shortest path. Alternatively, it may set the suspension time according to a predetermined algorithm; it may set the suspension time by generating random numeric values using time information, for example. It may also set an optimal suspension time, from the standpoint of usage of terminal and network resources, by including means for selecting an optimal suspension time setting method from among a plurality of suspension time setting methods (such as according to both the carrier signal conditions and communication activity of nearby terminals, according to only the carrier signal conditions of nearby terminals, according to only the communication activity of nearby terminals, or according to a predetermined algorithm, for example), thereby enabling effective use to be made of terminal and network resources.

As described above, the suspension time selector 5C in the third embodiment can shorten the recovery time when a problem occurs on the shortest path, and can reduce the probability that two geographically nearby terminals will start backup transmission simultaneously and that the transmitted packets will collide.

Fourth Embodiment

Figure 27:
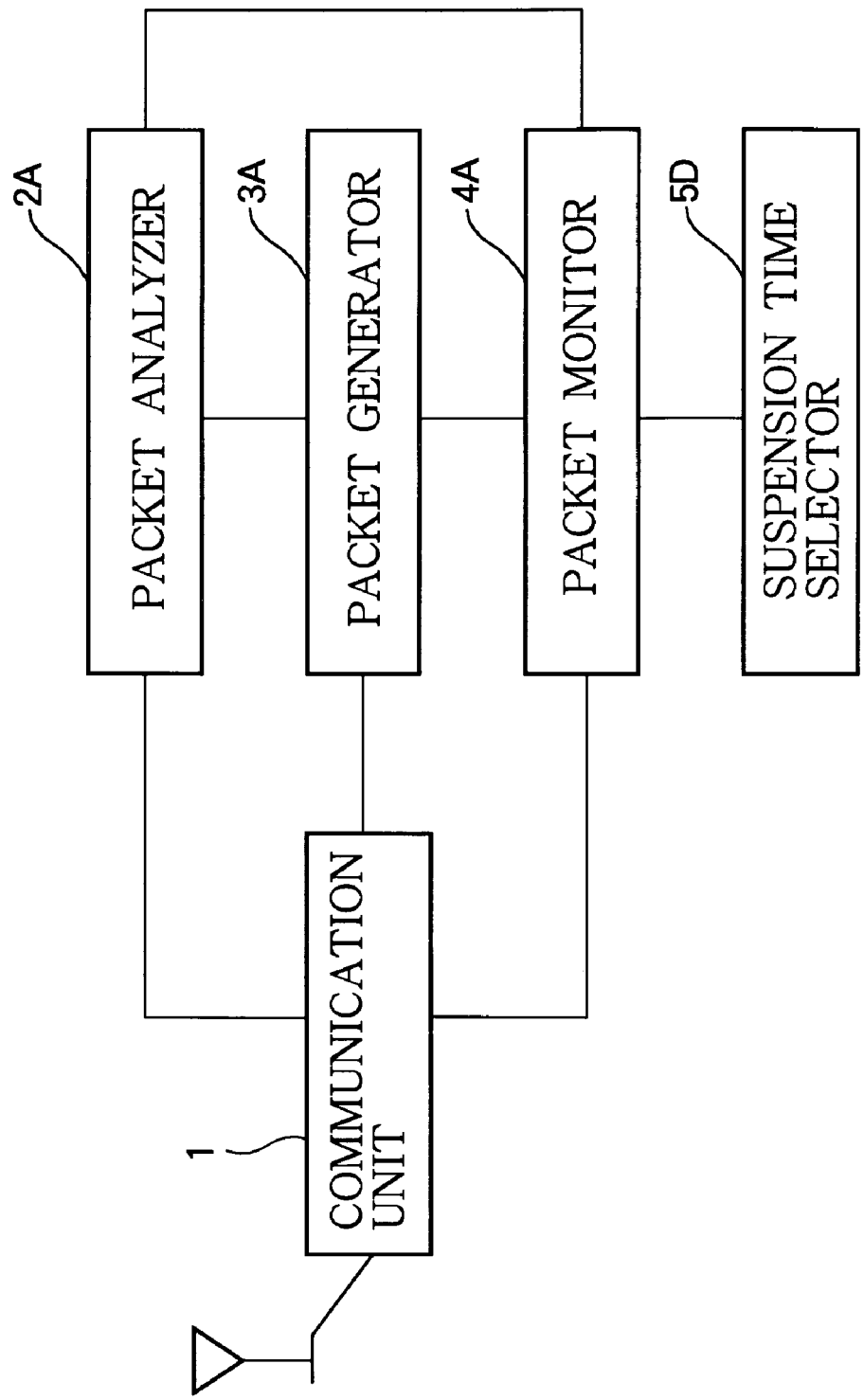
FIG. 27 is a block diagram of a wireless communication terminal according to a fourth embodiment.

Referring to FIG. 27, a terminal in the fourth embodiment comprises a communication unit 1, a packet analyzer 2A, a packet generator 3A, a packet monitor 4A, and a suspension time selector 5D. The terminal structure is the same as in the first embodiment except for the use of a different suspension time selector 5D, so only the functions of the suspension time selector 5D will be described below.

Like the suspension time selector 5A in the first embodiment, the suspension time selector 5D sets the suspension time during which the packet monitor 4A holds a packet. Suspension time selector 5D differs from suspension time selector 5A in that it is interconnected to neither the communication unit 1 nor the packet analyzer 2A, and sets the suspension time on, for example, a random basis.

Instead of monitoring the carrier signal conditions or the packet transmission activity of nearby terminals, the suspension time selector 5D sets the suspension time for holding packets by using certain information according to a predetermined algorithm. For example, it may set the suspension time by generating random numeric values using time information, or date and time information.

As described above, the suspension time selector 5D in the fourth embodiment has fewer interconnections with other components than the suspension time selectors 5A, 5B, and 5C in the first, second, and third embodiments, and its suspension time setting method is simpler, so it can be implemented easily, even on a terminal with only modest processing capability, and can make effective use of limited terminal resources, especially when the probability that transmitted packets will collide with packets transmitted by another terminal is inherently low.

Fifth Embodiment

The fifth embodiment of the present invention is based on a distance vector routing protocol. When a source terminal communicates with a destination terminal, multipath routing is performed in the following three steps.

Step 1: Each terminal in the network maintains a distance vector (DV) table listing neighboring terminals from which packets are received. If the same packet is received from a plurality of listed terminals (referred to below as DV terminals) the terminals are prioritized according to the reception timing.

Step 2: The source terminal adds information specifying the highest-priority DV terminal in its list and possibly one or more lower-priority DV terminals to a packet and transmits the packet.

Step 3: When a terminal receives the packet from the source terminal, it determines whether it is the highest-priority DV terminal or a lower-priority DV terminal. If it is the highest-priority DV terminal, also referred to below as the primary DV terminal, it immediately updates the DV terminal information in the received packet and relays the packet; if it is one of the lower-priority DV terminals, also referred to below as secondary DV terminals, it holds the packet suspended and waits for a designated suspension time to see whether or not the packet is relayed by another terminal. If it observes that the packet has been relayed by another terminal within the designated suspension time, it abandons the suspended packet; if it does not observe that the packet has been relayed by a higher-priority terminal within the certain period of time, it updates the DV terminal information included in the suspended packet and relays the suspended packet itself.

In step 3 above, the decision as to whether or not the packet has been relayed by a higher-priority terminal is made by noting whether or not the terminal receives a packet identical to the packet that it is holding suspended within the designated suspension time. If the terminal receives an identical packet within the suspension time, it decides that the packet has been relayed on a higher-priority path and abandons both the identical packet and the suspended packet; otherwise, it decides that the packet has not been relayed on a higher-priority path and relays the suspended packet itself.

Figure 28:
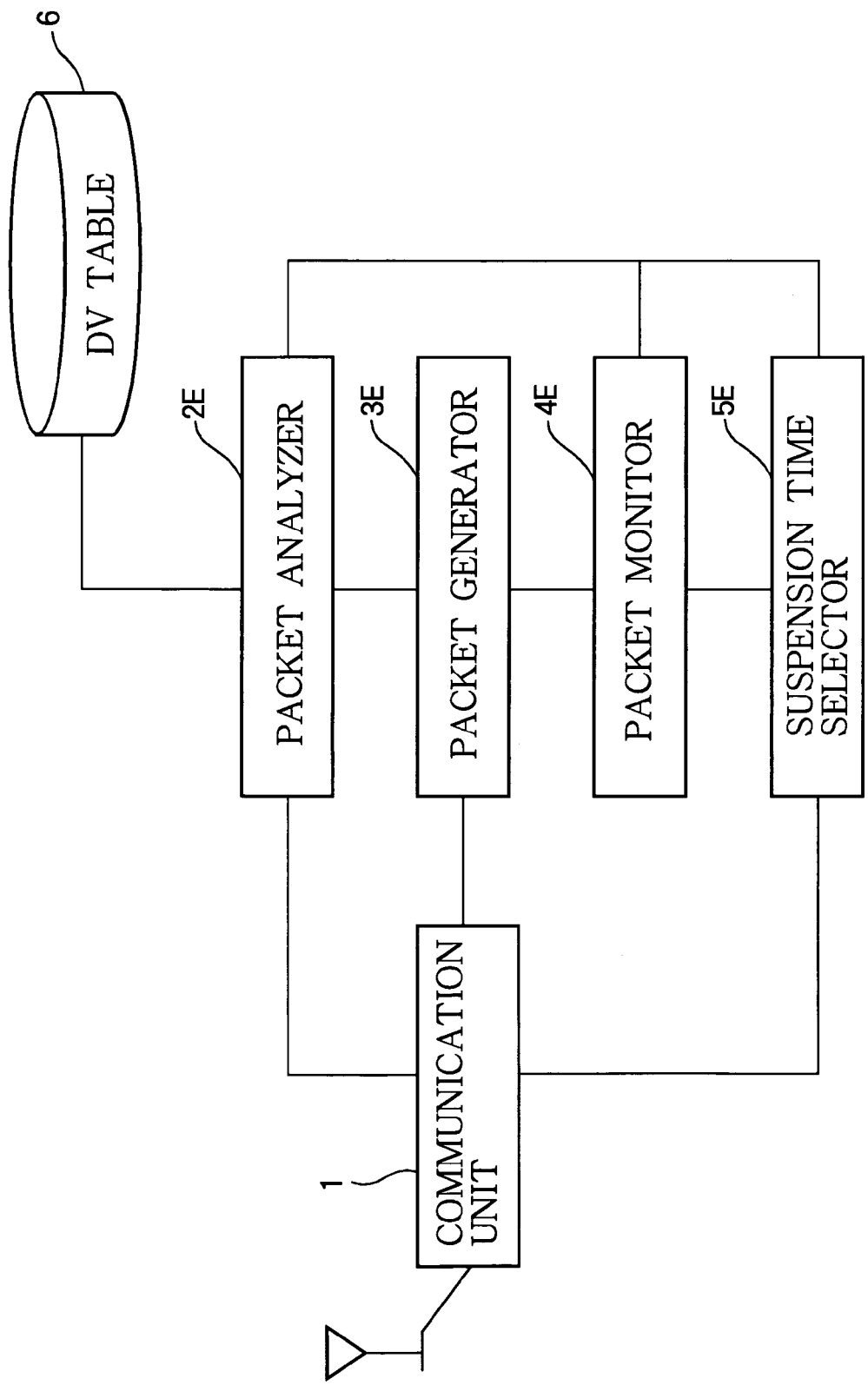
FIG. 28 is a block diagram of a wireless communication terminal according to a fifth embodiment.

Referring to FIG. 28, a terminal in the fifth embodiment comprises a communication unit 1, a packet analyzer 2E, a packet generator 3E, a packet monitor 4E, a suspension time selector 5E, and a memory unit storing distance vector table 6. The distance vector table 6 includes a destination field, a primary distance vector (PDV) field, an other distance vector (ODV) field, and a packet ID field.

The packet analyzer 2E analyzes packets received through the communication unit 1. In particular, the packet analyzer 2E performs the following three processes.

a) The packet analyzer 2E analyzes each packet received through the communication unit 1 to obtain the source address, the ID of the neighboring terminal from which the packet was received (terminal identification information such as a communication interface address, IP address, or MAC address), and the packet ID (a sequence number, port number, or other information identifying the packet); then, treating the source address as a destination terminal ID, it queries the distance vector table 6 to see if the distance vector table 6 already has an entry with the same destination terminal ID. If it does, and if and that entry also has the same packet ID, the packet analyzer 2E updates the distance vector table 6 by adding the new neighboring terminal ID to the entry as a secondary terminal ID in the ODV field. If the distance vector table 6 has an entry with the same destination terminal ID but a different packet ID, the packet analyzer 2E updates the entry by writing the new neighboring terminal ID as a primary terminal ID in the PDV field, replacing the existing primary terminal ID; writing the new packet ID in the packet ID field, replacing the existing packet ID; and deleting the new neighboring terminal ID from the ODV field if it is present in that field. If the distance vector table 6 does not have an entry with the same destination terminal ID, the packet analyzer 2E updates the distance vector table 6 by adding a new entry with the destination terminal ID in the destination field, the neighboring terminal ID in the PDV field, and the packet ID in the packet ID field.

b) If the terminal itself is the source terminal of a packet to be sent to a destination terminal, the packet analyzer 2E queries the distance vector table 6 for the PDV terminal ID and ODV terminal ID(s) corresponding to the destination terminal, and sends the PDV and ODV terminal IDs returned from the distance vector table 6 to the packet generator 3E as distance vector (DV) information.

c) Like the packet analyzer 2A in the first embodiment, packet analyzer 2E knows its own ID, that is, the ID of its own terminal, distinguishing that terminal from other terminals. When the packet analyzer 2E is an intermediate terminal, it analyzes a packet received by the communication unit 1 to obtain the PDV information, ODV information, and destination address included in the packet, and determines whether or not its own ID is included in the PDV and ODV information, thereby decides whether its own terminal is the PDV terminal, an ODV terminal, or neither. If the terminal is the PDV terminal, it uses the destination address of the packet as a destination terminal ID to query the distance vector table 6 for the PDV terminal ID and ODV terminal IDs that correspond to the destination terminal ID, and sends the packet to the packet generator 3E with the PDV and ODV terminal IDs returned from the distance vector table 6 as new DV information, for immediate relay through the communication unit 1. If the terminal is an ODV terminal, it uses the destination address of the packet as a destination terminal ID to query the distance vector table 6 for the PDV terminal ID and ODV terminal IDs that correspond to the destination terminal ID, and sends the packet to the packet monitor 4E with the PDV and ODV terminal IDs returned from the distance vector table 6 as new DV information, to be held suspended for a suspension time set by the suspension time selector 5E. If the terminal is neither a PDV terminal nor an ODV terminal, the packet analyzer 2E abandons the packet.

The distance vector table 6 is a data table for storing entries with destination, primary distance vector (PDV), other distance vector (ODV), and packet ID fields, as shown in FIG. 29. The destination field stores a source address obtained from a packet by the packet analyzer 2E as a destination terminal ID; the packet ID field stores the most recent packet ID obtained by the packet analyzer 2E from a packet originating from that source address; the PDV field stores the ID of the first neighboring terminal that relayed a packet with that source address and packet ID, obtained as a neighboring terminal ID by the packet analyzer 2E; the ODV field stores the IDs of all other neighboring terminals that have relayed packets originating from the same source address, these IDs also having been obtained as neighboring terminal IDs by the packet analyzer 2E. Typically, the PDV field gives the ID of the nearest terminal that has relayed a packet from the source address listed as the destination terminal ID in the entry, and the ODV field gives the IDs of the second nearest terminal and other neighboring terminals that have relayed packets originating from the same address.

The packet generator 3E receives packet body data and a destination address, generates a packet by adding its own terminal ID and the PDV and ODV information listed in the distance vector table 6 for the received destination address, and transmits the generated packet through the communication unit 1. More specifically, the packet generator 3E performs the following two processes.

A) The packet generator 3E deletes the previous DV information (PDV and ODV information) of a packet received from the packet analyzer 2E, updates the DV information by writing the new DV information received from the packet analyzer 2E, and transmits the packet with the updated DV information through the communication unit 1.

B) The packet generator 3E deletes the previous DV information (PDV and ODV information) of a packet received from the packet monitor 4E, updates the DV information by writing the new DV information received from the packet monitor 4E, and transmits the packet with the updated DV information through the communication unit 1.

The packet monitor 4E holds a packet and the associated new DV information that it receives from the packet analyzer 2E suspended for a suspension time set by the suspension time selector 5E. If it receives a packet identical to the packet it is holding suspended from the packet analyzer 2E within the suspension time, it decides that the packet has been successfully relayed by another terminal and abandons both the suspended packet and the newly received identical packet, together with their associated DV information. If it does not receive an identical packet from the packet analyzer 2E within the suspension time, it decides that the packet has not successfully relayed by any other terminal, and sends the suspended packet and its updated DV information to the packet generator 3E, to be transmitted through the communication unit 1.

The suspension time selector 5E sets the suspension time during which the packet monitor 4E holds a packet, using any of the methods employed by the suspension time selectors 5A to 5D in the first to fourth embodiments.

The operation of an ad hoc network configured with the terminals in the fifth embodiment will be described below.

When a terminal in the network receives a packet from another terminal, the packet analyzer 2E analyzes the packet to obtain the source address, the ID of the neighboring terminal from which it received the packet, and the packet ID, and sends the source address as a destination terminal ID query to the distance vector table 6, also sending the packet ID.

If the source address is already stored as a destination terminal ID in an entry in the distance vector table 6 and the packet ID matches the packet ID in that entry, the packet analyzer 2E recognizes that the received packet is identical to a packet that it has already received from another neighboring terminal, and updates the distance vector table 6 by adding the neighboring terminal ID of the packet to the ODV field of the entry.

If the source address of the packet is already stored as a destination terminal ID in an entry in the distance vector table 6 but the packet ID differs from the packet ID of that entry, the packet analyzer 2E recognizes the neighboring terminal identified by the neighboring terminal ID as the first terminal from which it has received the packet, and updates the distance vector table 6 by replacing the PDV information in the entry with the neighboring terminal ID. If the ODV field of the entry includes the neighboring terminal ID, the packet analyzer 2E deletes the neighboring terminal ID from that field. The packet analyzer 2E also replaces the packet ID information in the entry with the packet ID of the received packet.

If the source address is not stored as a destination terminal ID in any entry in the distance vector table 6, the packet analyzer 2E determines likewise that the terminal with the neighboring terminal ID is the first terminal from which it has received the packet and updates the distance vector table 6 by adding a new entry listing the source address of the packet in the destination field, the neighboring terminal ID in the PDV field, and the packet ID to the packet ID field. The distance vector table 6 is accordingly updated every time a packet is received.

When a source terminal transmits a packet to a destination terminal from which it has already received one or more packets, as a result of the update process above, the source terminal's distance vector table 6 has an entry listing the destination terminal's address (ID) in the destination field. The packet analyzer 2E sends the destination terminal ID to the distance vector table 6 as a query to obtain the PDV terminal ID and ODV terminal IDs, if any, listed in this entry and sends the PDV terminal ID and any ODV terminal IDs received from the distance vector table 6 as DV information to the packet generator 3E; the packet generator 3E adds the PDV information and the ODV information received from the packet analyzer 2E to the packet to be transmitted to the destination terminal, and transmits the packet through the communication unit 1.

Figure 30:
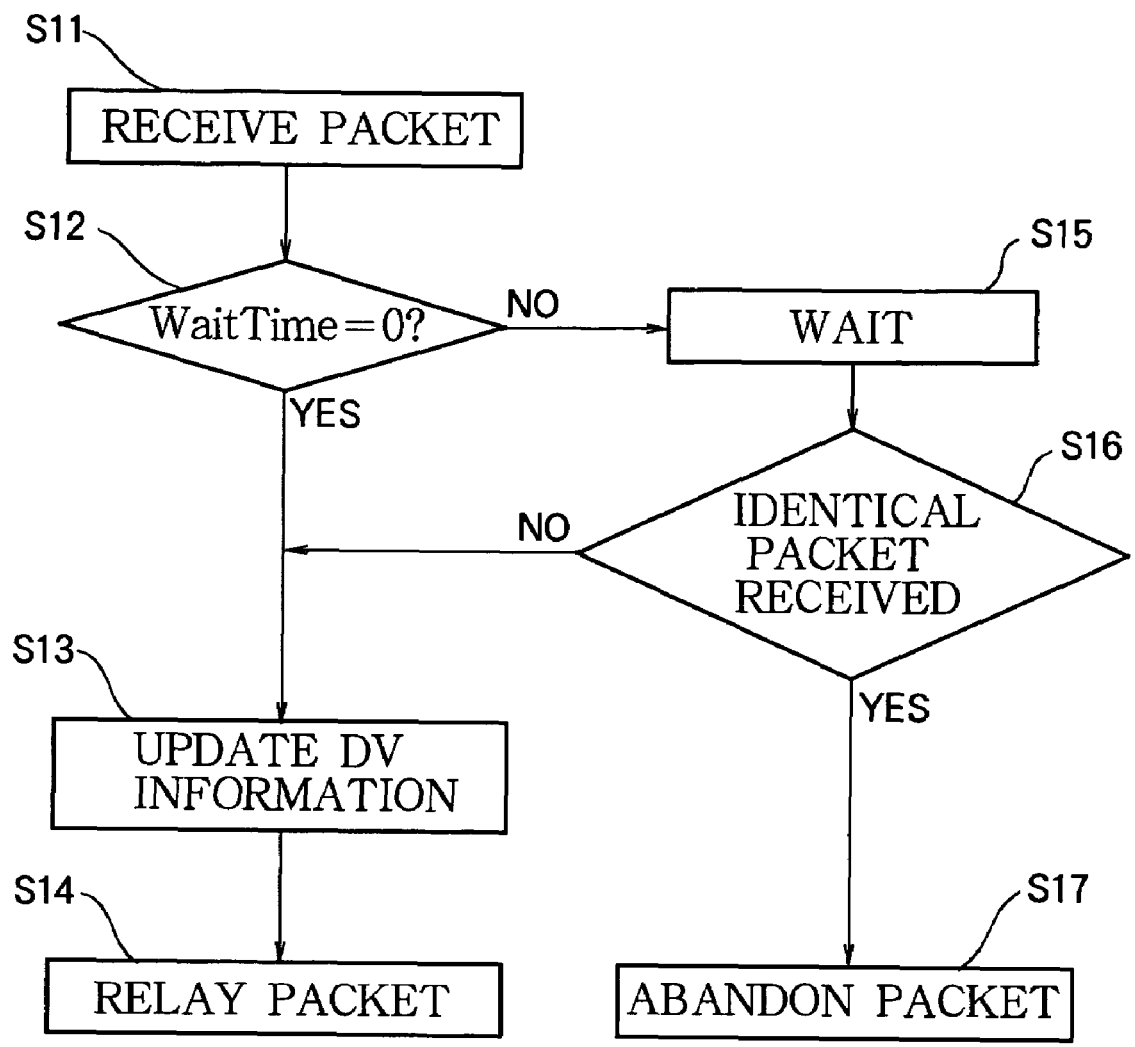
FIG. 30 is a flowchart illustrating the routing operation performed by the terminal in FIG. 28.

Referring to FIG. 30, when an intermediate terminal receives a packet with PDV information and ODV information added (step 11), the packet analyzer 2E analyzes the packet to obtain the PDV and ODV information and the destination address, and depending on whether its own terminal ID is included in the PDV information or in the ODV information, it determines whether its own terminal is a PDV terminal (included in the obtained PDV information), an ODV terminal (included in the obtained ODV information), or neither of these (included in neither the PDV nor the ODV information) (step 12). If the terminal is the PDV terminal, it has the highest priority to relay the received packet, so it need not wait to see if any other terminal relays the packet; its wait time is substantially zero (WaitTime=0). The distance vector table 6 update process described above is also performed when the packet is received.

If the terminal is a PDV terminal (Yes in step S12), the packet analyzer 2E sends the destination address of the packet as a destination terminal ID query to the distance vector table 6. The distance vector table 6 returns the PDV terminal ID and ODV terminal IDs listed in the same entry with the destination terminal ID. The packet analyzer 2E sends this PDV and ODV information together with the received packet to the packet generator 3E.

When the packet generator 3E receives the packet and accompanying DV information (PDV and ODV information) from the packet analyzer 2E, it updates the DV information (PDV and ODV information) in the packet received from the packet analyzer 2E with the PDV and ODV information received from the packet analyzer 2E (step S13) and immediately relays the packet with the updated DV information through the communication unit 1 (step S14). The terminal identified by the updated PDV information is newly designated by the intermediate terminal as a PDV terminal, and inherits the highest priority (WaitTime=0).

If the terminal is neither a PDV terminal (No in step S12) nor an ODV terminal, the packet analyzer 2E abandons the received packet.

If the terminal is not a PDV terminal (No in step S12) but is an ODV terminal, the packet analyzer 2E sends the obtained destination address of the packet as a destination terminal ID query to the distance vector table 6. The distance vector table 6 returns the PDV terminal ID and ODV terminal IDs listed in the same entry as the destination terminal ID. The packet analyzer 2E sends the packet together with the PDV and ODV terminal IDs returned from the distance vector table 6 to the packet monitor 4E.

When the packet monitor 4E receives the packet and accompanying DV information (PDV and ODV information) from the packet analyzer 2E, it determines whether or not it already holds a packet identical to the received packet. If it is not holding an identical packet, it holds the received packet and the accompanying DV information suspended and waits until the suspension time set by the suspension time selector 5E elapses (step S15). During this time, the packet monitor 4E determines whether or not the packet it is holding suspended has been successfully relayed by another neighboring terminal by noting whether a packet identical to the suspended packet is received from the packet analyzer 2E through the communication unit 1 (step S16).

If the packet monitor 4E receives a packet identical to the packet it is holding suspended from the packet analyzer 2E within the suspension time, it decides that the packet has been successfully relayed by another neighboring terminal, abandons the suspended packet and the received identical packet, and deletes the DV information concerning those two packets (step S17).

If the packet monitor 4E does not receive a packet identical to the suspended packet from the packet analyzer 2E within the suspension time, it assumes that the packet has not been successfully relayed by another neighboring terminal, and sends the suspended packet and its new DV information to the packet generator 3E.

When the packet generator 3E receives the packet and the new DV information from the packet monitor 4E, it updates the DV information (PDV and ODV information) of the packet received from the packet monitor 4E with the new PDV and ODV information received from the packet monitor 4E, and transmits the packet with the updated DV information through the communication unit 1. The terminal included in the PDV information is a PDV terminal newly designated by this intermediate terminal and has the highest priority (Wait-Time=0).

The decision whether or not the suspended packet is identical to the received packet is made, for example, by sending the received packet with its packet ID (or packet ID, source address, and destination address), obtained by analysis of the packet, to the packet monitor 4E from the packet analyzer 2E and having the packet monitor 4E decide whether or not the received packet and the suspended packet match with respect to their packet IDs (or packet IDs, source addresses, and destination addresses).

Like the suspension time selector 5A in the first embodiment, the suspension time selector 5E monitors the communication signal conditions of neighboring terminals in a wider range than the range of terminals with which it can communicate, by monitoring carrier sensing by the communication unit 1, and sets the waiting time for relaying packets (the suspension time) according to the monitored conditions.

Alternatively, like the suspension time selector 5B in the second embodiment, the suspension time selector 5E may monitor the transmission and reception of packets by neighboring terminals by monitoring their activity through the packet analyzer 2E, thereby monitoring the regularity of the activity of the PDV terminal obtained through the analysis by the packet analyzer 2E and the PDV terminal obtained by the query to the distance vector table 6 made by the packet analyzer 2E, and set the period of time during which to hold the received packet suspended (the suspension time) accordingly.

Like the suspension time selector 5C in the third embodiment, the suspension time selector 5E may also monitor both the communication signal conditions of the neighboring terminals in a wider range than its communication range through the communication unit 1 and the packet transmission activity of the neighboring terminals on the shortest path through the packet analyzer 2E, and set the period of time during which the terminal holds packets suspended (the suspension time) accordingly.

Like the suspension time selector 5D in the fourth embodiment, the suspension time selector 5E may set the period of time during which the terminal holds packets suspended (the suspension time) on a random basis.

Furthermore, as in the first to the third embodiments, the suspension time selector 5E may also have means for selecting an optimal method of setting the suspension time from among a plurality of methods, thereby enabling the optimal use of terminal resources and network resources.

Unlike the first to fourth embodiments, in the fifth embodiment, the main path and backup paths are not set in the source terminal, but individual terminals in the network hold DV terminal IDs (the PDV terminal ID and ODV terminal IDs) for each destination terminal. The PDV terminals for a given destination terminal chain together to form a single-path route to the destination terminal. If DV terminals were not classified as PDV terminals and ODV terminals, then every DV terminal might recognize itself as a main path terminal and immediately relay packets, causing interference. To solve this problem, the fifth embodiment incorporates the novel PDV and ODV categories, and has only the PDV terminal relay packets immediately, while ODV terminals suspend packets for a certain suspension time, resulting in a single main path with reduced occurrence of interference.

As described above, in the fifth embodiment, each packet includes a PDV terminal ID and possibly one or more ODV terminal IDs; if the packet is received by the PDV terminal, it is immediately relayed; if the packet is not received by the PDV terminal but is received by an ODV terminal, the packet is relayed after a certain suspension time, provided an identical packet is not received during the suspension time. The main path formed by linking the PVD terminals and the backup path or paths formed by linking ODV terminals are therefore temporally separated, and are also spatially separated in that they do not intersect. Accordingly, this embodiment assures reliable communication, reduces interference among terminals, thereby prevents packet loss and transmission delay, and enables the effective use of network resources.

Sixth Embodiment

The sixth embodiment modifies the fifth embodiment by adjusting the suspension time of a received packet according to the number of packet streams or flows being relayed by the terminal current terminal, and by allowing even terminals on the single-path route to suspend packets when they are relaying multiple flows.

In the fifth embodiment, the relay priority of a terminal is set according to DV information included in a received packet (depending on whether the terminal is the PDV terminal or an ODV terminal); the higher the priority is, the shorter the suspension time becomes, but a terminal that is already overloaded by relaying many packet streams or flows as a high-priority terminal may be unable to relay further packet streams or flows, even if it has high priority for these flows. To solve this problem, the sixth embodiment has the terminal increase its suspension time as the number of packet streams or flows the terminal is relaying increases, thereby giving other terminals increased opportunity to relay new packet flows, thereby allowing them to assume more of the load, thus distributing load over the network. Adjusting the relay priority according to the number of packet streams or flows being relayed by the terminal in this way has significant implications for load balancing.

Figure 31:
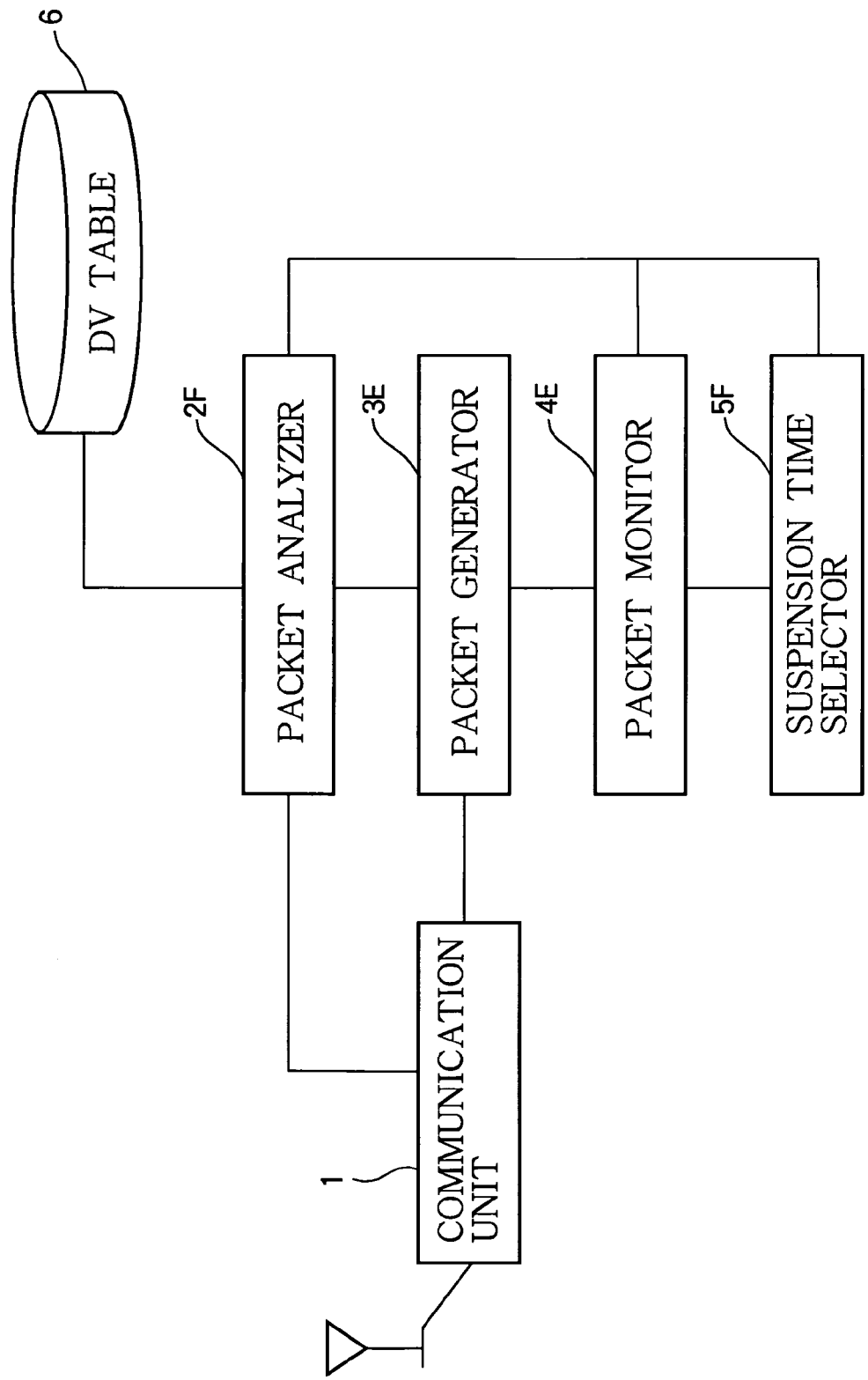
FIG. 31 is a block diagram of a wireless communication terminal according to a sixth embodiment.

Referring to FIG. 31, a terminal in the sixth embodiment comprises a communication unit 1, a packet analyzer 2F, a packet generator 3E, a packet monitor 4E, a suspension time selector 5F, and a distance vector table 6. That is, the terminal in this embodiment replaces the packet analyzer 2E and the suspension time selector 5E in the fifth embodiment (FIG. 28).

The packet analyzer 2F analyzes packets received through the communication unit 1, and performs at least the following four processes.

a) The packet analyzer 2F analyzes packets received through the communication unit 1 and updates the distance vector table 6 by carrying out the same process a) as carried out by the packet analyzer 2E in the fifth embodiment.

b) The terminal holds a relay flow count (fn) indicating the number of flows currently being relayed. When it first relays a packet between an arbitrary pair of terminals, it retains the IDs of those two terminals for a fixed period of time, holding one as a source terminal ID and the other as a destination terminal ID, and adds one to the relay flow count fn. If it relays another packet between the same pair of terminals while retaining their IDs, it extends the retention period by a fixed amount. If the retention period expires without the relay of another packet between the two terminals, their IDs are deleted and the relay flow count fn is decremented by one.

Since the source and destination terminals are distinguished, packet flows are counted in the sixth embodiment as one-way flows. If two terminals both send packets to each other during a communication session and an intermediate terminal relays the packets in both directions between these two terminals, the intermediate terminal counts the session as two flows. If the session is an extended one, the intermediate terminal may also periodically clear the two terminal IDs it is holding and reduce its relay flow count to zero.

c) If the terminal is the source terminal from which a packet is to be sent, the packet analyzer 2F queries the distance vector table 6 to obtain the PDV terminal ID and ODV terminal IDs corresponding to the destination terminal, and sends the PDV terminal ID returned from the distance vector table 6 as PDV information (first DV information) to the packet generator 3E, sends any one of the one or more ODV terminal IDs returned from the distance vector table 6 to the packet generator 3E as second DV information, and sends the other ODV terminal IDs (if any) to the packet generator 3E as the third DV information. Alternatively, it is possible to include all returned ODV terminal IDs in the second DV information and not to generate the third DV information.

d) Similar to the packet analyzer 2A in the first embodiment, the packet analyzer 2F holds the ID of its own terminal, which distinguishes this terminal from other terminals. If the terminal is an intermediate terminal, the packet analyzer 2F analyzes the packet received through the communication unit 1 to obtain the first, second, and third DV information and the destination address, and decides whether or not its own terminal ID appears in the first, second, or third DV information, thereby deciding whether the terminal is a first, second, or third DV terminal, or none of these.

If the terminal is the first DV terminal and the relay flow count is one (fn=1), the packet analyzer 2F sends the destination terminal address of the packet as a destination terminal ID query to the distance vector table 6 and obtains the corresponding PDV terminal ID and ODV terminal IDs in return; then it sends the returned PDV terminal ID as first DV information, any one of one or more returned ODV terminal IDs as second DV information, and the other ODV terminal IDs as third DV information together with the received packet to the packet generator 3E, for immediate transmission through the communication unit 1.

In this process d), the number of flows currently being relayed increases by one, and the relay flow count fn is incremented by one, as soon as a packet with a new pair of source and destination addresses is received; if the terminal is not relaying any other flow, the relay flow count becomes one (fn=1); if the terminal is currently relaying two other flows, the relay flow count becomes three (fn=3). The relay flow count fn described in process d) above therefore includes the flow to which the received packet belongs.

If the terminal is the first DV terminal and the relay flow count is greater than one (fn≧2), or if the terminal is a second or third DV terminal, the packet analyzer 2F sends the destination address of the packet as a destination terminal ID query to the distance vector table 6 and obtains the corresponding PDV terminal ID and ODV terminal IDs in return. The packet analyzer 2F then sends the packet to the packet monitor 4E together with the returned PDV terminal ID as first DV information, any one of the one or more returned ODV terminal IDs as second DV information, and the other ODV terminal IDs as third DV information. The packet analyzer 2F also sends the relay flow count fn to the suspension time selector 5F and informs the suspension time selector 5F as to whether the terminal itself is listed as a first, second, or third DV terminal in the received packet, to enable the packet analyzer 2F to determine the suspension time for which the received packet and accompanying DV information (first, second, and third DV information) will be held suspended in the packet monitor 4E.

If the terminal is not a first, second, or third DV terminal, the packet analyzer 2F abandons the packet.

The suspension time selector 5F sets a suspension time during which the packet monitor 4E holds the packet suspended according to the value of the relay flow count fn and whether the terminal is a first, second, or third DV terminal or none of these. If the received packet is immediately relayed (the terminal is the first DV terminal and the relay flow count is one), the time interval from reception to transmission of the packet can be assumed equal to the short inter-frame space (SIFS) defined in the well-known IEEE 802.11b standard concerning wireless local area network media access control and physical layer specifications, for example, and a period of time determined by adding the packet suspension time in the packet monitor 4E to the SIFS value may be used as the waiting time. Incidentally IEEE stands for the Institute of Electrical and Electronics Engineers.

If the terminal is the second DV terminal and the relay flow count is one (fn=1), the suspension time selector 5E sets the waiting time to SIFS×2 (the suspension time thus being equal to the SIFS value); if the terminal is a third DV terminal and the relay flow count is one (fn=1), the suspension time selector 5F sets the waiting time to SIFS×3 (the suspension time thus being equal to SIFS×2); if the terminal is the first DV terminal and the relay flow count is greater than one (fn≧2), the suspension time selector 5F sets the waiting time to SIFS+(fn−1)×SIFS×3 (the suspension time thus being equal to (fn−1)×SIFS×3); if the terminal is the second DV terminal and the relay flow count is greater than one (fn>2), the suspension time selector 5F sets the waiting time to SIFS×2+(fn−1)×SIFS×3 (the suspension time thus being equal to SIFS+(fn−1)×SIFS×3); if the terminal is a third DV terminal and the relay flow count is greater than one (fn>2), the suspension time selector 5F sets the waiting time to SIFS×3+(fn−1)×SIFS×3 (the suspension time thus being equal to SIFS×2+(fn−1)×SIFS×3).

The basic waiting times for the first, second, and third DV terminals are accordingly SIFS, SIFS*2, and SIFS*3, but longer waiting times are set for terminals with lower relay priority, by lengthening the suspension times. If a plurality of flows are being relayed, it is desirable to have the second and subsequent flows relayed after respective delays of SIFS×3, so the waiting time is made SIFS×3 longer for each flow being relayed, other than the flow to which the received packet belongs (there are fn−1 of these other flows).

In FIGS. 32A and 32B, Src indicates the source terminal, 1st indicates the first DV terminal, 2nd indicates the second DV terminal, 3rd indicates the third DV terminal, and DATA indicates a packet to be sent from the source terminal (Src) and relayed.

FIG. 32A show the case in which the first, second, and third DV terminals have no packet flows other than the packet (DATA) flow received from the source terminal (Src) (relay flow count fn=1). The waiting time at the first DV terminal is SIFS (suspension time is 0); the waiting time at the second DV terminal is SIFS×2 (suspension time is SIFS); the waiting time at the third DV terminal is SIFS×3 (suspension time is SIFS×2).

Among the three DV terminals, the first DV terminal relays the packet (DATA) immediately after the minimum waiting time SIFS. The second and third DV terminals each receive the packet relayed by the first DV terminal within the predetermined waiting time and abandon the packet received from the first DV terminal and the suspended packet received from the source terminal.

FIG. 32B shows the case in which the second DV terminal has no packet flow other than the flow including the data packet received from the source terminal (Src) (relay flow count fn=1), but the first and third DV terminals are already relaying one other flow each, in addition to the flow including the data packet received from the source terminal (Src) (relay flow count fn=2). The waiting time at the first DV terminal is SIFS×4 (suspension time is SIFS×3); the waiting time at the second DV terminal is SIFS×2 (suspension time is SIFS); the waiting time at the third DV terminal is SIFS×6 (suspension time is SIFS×5).

Among the three DV terminals, the second DV terminal has the shortest waiting time, so it relays the packet (DATA) after this waiting time (SIFS×2). The first and third DV terminals each receive the packet relayed by the second DV terminal within their predetermined waiting time and abandon the packet received from the second DV terminal and the suspended packet received from the source terminal. The packet is therefore relayed on a single backup path, bypassing the first DV terminal.

As described above, the sixth embodiment allows a terminal to adjust its waiting time according to the number of flows it is relaying, so that it can reduce its load when it is relaying many flows at once. This feature enables load to be distributed over the network as a whole.

Seventh Embodiment

Referring to FIG. 33, a terminal in the seventh embodiment comprises a communication unit 1, a packet analyzer 2F, a packet generator 3A, a packet monitor 4A, and a suspension time selector 5G. The seventh embodiment applies the principle of the sixth embodiment to the first to fourth embodiments by replacing the packet analyzer 2A and suspension time selector 5A of the first embodiment with the packet analyzer 2G and suspension time selector 5G, which are similar to the packet analyzer 2F and suspension time selector 5F in the sixth embodiment.

The packet analyzer 2G analyzes packets received through the communication unit 1, performing at least the following four processes.

a) The packet analyzer 2G generates path information (listing terminals on the shortest path) by carrying out the same process a) as carried out by the packet analyzer 2A in the first embodiment, and sends the path information to the packet generator 3A.

b) The packet analyzer 2G maintains and updates a relay flow count (fn) by carrying out the same process b) as carried out by the packet analyzer 2F in the sixth embodiment.

c) The packet analyzer 2G, like the packet analyzer 2A in the first embodiment, knows its own terminal ID, analyzes a packet received by the communication unit 1 to obtain the attached path information, the source and destination addresses, and the packet ID, and decides whether its own terminal ID is included in the path information. If its own terminal ID is included in the path information and the relay flow count is one (fn=1), the packet analyzer 2G sends the packet to the packet generator 3A for immediate relay through the communication unit 1. If its own terminal ID is not included in the path information, or if the relay flow count is greater than one (fn>2), the packet analyzer 2G sends the packet to the packet monitor 4A to be suspended for the time set by the suspension time selector 5G.

The suspension time selector 5G sets a suspension time during which the packet monitor 4A holds the packet suspended according to the value of the relay flow count fn and whether the terminal is included in the path information. If the received packet is immediately relayed (the terminal is included in the path information and the relay flow count is one), the time interval from reception of the packet to transmission thereof can be assumed equal to the short inter-frame space (SIFS) defined in the above-mentioned IEEE 802.11b standard, for example, and a period of time determined by adding the packet suspension time in the packet monitor 4A to the SIFS value may be used as the waiting time.

If the terminal is not included in the path information and the relay flow count is one (fn=1), the suspension time selector 5G sets the waiting time to SIFS×2 (the suspension time thus being equal to the SIFS value); if the terminal is included in the path information and the relay flow count is greater than one (fn>2), the suspension time selector 5G sets the waiting time to SIFS+(fn−1)×SIFS×3 (the suspension time thus being equal to (fn−1)×SIFS×3); if the terminal is not included in the path information and the relay flow count is greater than one (fn>2), the suspension time selector 5G sets the waiting time to SIFS×2+(fn−1)×SIFS×3 (the suspension time thus being equal to SIFS+(fn−1)×SIFS×3).

The basic waiting times for a terminal included in the path information and a terminal not included in the path information are thus defined as SIFS and SIFS*2, respectively. Longer waiting times are set for terminals with lower relay priority by lengthening the suspension times. If a plurality of flows are being relayed, it is desirable to have the second and subsequent flows relayed after delays of SIFS×3 each, so the waiting time is made SIFS×3 longer for each flow being relayed, other than the flow to which the received packet belongs (there are fn−1 of these other flows).

The operation of an intermediate terminal that is included in the path information in the ad hoc network configured by a plurality of the terminals in the seventh embodiment is similar to the operation of the first DV terminal shown in FIGS. 32A and 32B, for example; the operation of an intermediate terminal that is not included in the path information is similar to the operation of the second DV terminals shown in FIGS. 32A and 32B.

As described above, in the seventh embodiment, the suspension time of a received packet can be adjusted according to the relay priority of the terminal and the number of packet flows currently being relayed by the terminal to reduce the terminal's load when the terminal is already relaying a number of flows, whereby load can be distributed over the network.

Eighth Embodiment

To route packets from a source terminal to a destination terminal, the eighth embodiment divides the communication space of an ad hoc network into a plurality of routing zones. More specifically, it divides the space into a passive zone, in which packets are transferred on a main path by single-path routing, and an active zone, peripheral to the passive zone, in which packets are transferred on backup paths by multipath routing, using a controlled flooding scheme. The main path is thereby spatially separated from the backup paths.

The passive zone is an inner zone located between the source and destination terminals, centered around one or more assigned median terminals. The active zone is a doughnut-shaped area surrounding the passive zone. The single main path in the passive zone may be constructed by a combination of the source routing method used in the first to fourth embodiments and the distance-vector routing method used in the fifth embodiment. The backup paths in the active zone are controlled by an unconditional relay table. A median terminal is assigned each time there is a request for packet transmission from any one terminal in the network to another terminal in the network. The passive zone and active zone are defined in terms of distance from the median terminal, distance being defined as number of hops.

Spatial separation of the active and passive zones makes it possible to provide a substantially interference-free main communication path, while still providing backup paths to prevent a break in communication if communication on the main path is lost. The use of different transmission protocols on the main path and the backup paths conserves network resources, as compared with network-wide controlled flooding schemes.

Figure 34:
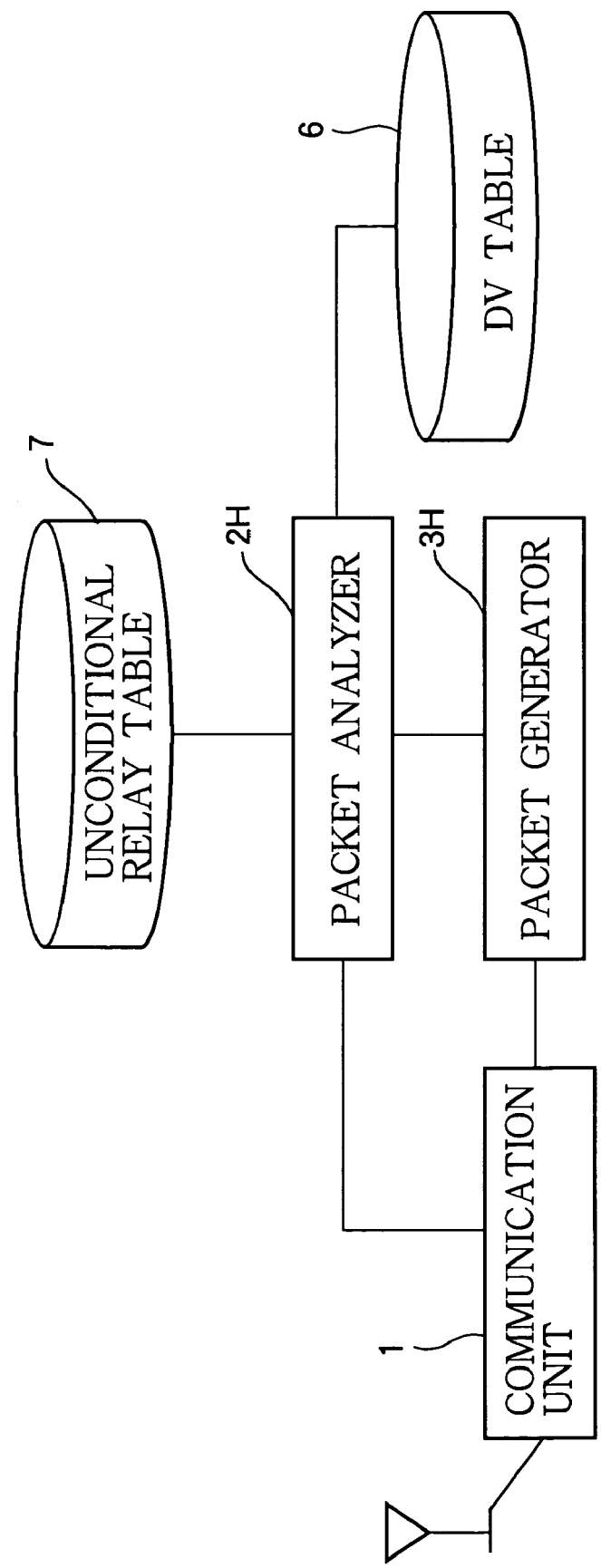
FIG. 34 is a block diagram of a wireless communication terminal according to an eighth embodiment.

Referring to FIG. 34, a terminal in the eighth embodiment comprises a communication unit 1, a packet analyzer 2H, a packet generator 3H, a distance vector table 6, and an unconditional relay table 7.

The packet analyzer 2H analyzes packets received through the communication unit 1, performing at least the following four processes.

a) The packet analyzer 2H analyzes each packet received by the communication unit 1 to obtain the source address of the packet, the terminal ID (an IP address, MAC address, or other identifying information) of the neighboring terminal that transmitted the packet, and the packet ID (a sequence number, port number, or other information identifying the packet) and sends the source address as a destination address, the neighboring terminal ID as a distance vector (DV) terminal ID, and the packet ID as a packet ID to the distance vector table 6 to be stored.

b) When the terminal acts as a source terminal by transmitting a communication request packet addressed to a destination terminal and receiving communication request reply packets from the destination terminal, the packet analyzer 2H analyzes the relay terminal information attached to each received communication request reply packet, listing the intermediate terminals that relayed the communication request reply packet, to find the shortest path to the destination terminal. More specifically, the packet analyzer 2H obtains the terminal ID of each terminal on the shortest path, and the hopcount (number of hops) to the destination terminal and to each terminal on the shortest path.

On the basis of these hopcounts, the packet analyzer 2H selects one or more terminals on the shortest path to assign as median terminals. If only one median terminal is selected, it is preferably located at the middle of the shortest path. If more than one median terminal is selected, the median terminals are preferably spaced at equal intervals on the shortest path. The maximum number of median terminals that may be selected is one less than the total hopcount to the destination terminal; that is, all intermediate terminals on the shortest path may be selected as median terminals. The selected median terminals are notified of their status by an assignment packet generated at the source terminal. (The invention is not limited to this assignment method; in a variation of the eighth embodiment, the assignment packet is generated at the destination terminal. Alternatively, the median terminals may assign themselves.)

The packet analyzer 2H also calculates the hopcount from the source terminal to the closest assigned median terminal, the hopcount from the destination terminal to the median terminal closest to the destination terminal, and the hopcounts from one median terminal to the next median terminal on the shortest path, calculates a passive zone hopcount (hp), equal to one less than the largest of these hopcounts, and calculates an active zone hopcount (ha) equal to one more than the largest of these hopcounts.

The packet analyzer 2H-sends the packet generator 3H the IDs of the assigned median terminals, the passive zone hopcount (hp), the active zone hopcount (ha), and the IDs of the two endpoint terminals between which packets are to be relayed, that is, the ID of its own terminal and the ID of the destination terminal.

c) The packet analyzer 2H analyzes each packet received by the communication unit 1 to determine whether the packet is an assignment packet assigning the packet analyzer's terminal as a median terminal, a zone control packet, or an ordinary data packet. If the packet is an assignment packet assigning the terminal as a median terminal, the packet analyzer 2H reads the passive zone hopcount (hp), the active zone hopcount (ha), and the IDs of the two endpoint terminals (the source terminal ID and the destination terminal ID), sets a time-to-live (TTL) hopcount used for zone control to one less than the active zone hopcount (ha), and sends the passive zone hopcount (hp), the active zone hopcount (ha), the two endpoint terminal IDs, and the time-to-live hopcount (TTL=ha −1) to the packet generator 3H, which generates a zone control packet.

d) If the packet received by the communication unit 1 is a zone control packet, the packet analyzer 2H reads the passive zone hopcount (hp), the active zone hopcount (ha), and the time-to-live hopcount (TTL) to decide whether its own terminal belongs to the passive zone or active zone. If the difference between the active zone hopcount and time-to-live hopcount is equal to or less than the passive zone hopcount (ha−TTL≦hp), the terminal belongs to the passive zone; if this difference is greater than the passive zone hopcount (ha−TTL>hp), the terminal belongs to the active zone. If multiple zone control packets including the same endpoint terminal IDs are received, the zone is determined from the first received zone control packet; alternatively, the zone may be determined from the zone control packet with the largest time-to-live hopcount (TTL).

If the terminal is in the active zone, the packet analyzer 2H reads the IDs of the two endpoint terminals (the source terminal ID and the destination terminal ID), and sends those endpoint terminal IDs to the unconditional relay table 7 to be stored for a predetermined time. If the time-to-live hopcount (TTL) is greater than zero, (in which case the terminal may be in either the passive zone or the active zone), the packet analyzer 2H subtracts one from the TTL value to obtain a new TTL value, and sends the zone control packet and the new TTL value to the packet generator 3H, which updates the TTL value in the zone control packet and transmits the packet through the communication unit 1.

e) If the packet received by the communication unit 1 is an ordinary data packet, the packet analyzer 2H reads the source address and destination address, and queries the unconditional relay table 7 to see if the pair of terminals with these two addresses are listed in the unconditional relay table 7, that is, whether the terminal is in the active zone defined for that pair of endpoint terminals. If the terminal is in the active zone, the packet analyzer 2H sends the packet to the packet generator 3H to be transmitted (flooded) through the communication unit 1.

If the terminal is not in the active zone defined for the source and destination terminals, the packet analyzer 2H determines whether the routing information in the packet includes a distance vector (DV) terminal ID, and if so, whether the DV terminal ID matches the terminal's own ID. If the DV terminal ID is present and matches the terminal's own ID, indicating that the terminal is on the single-path route in the passive zone, the packet analyzer 2H sends the destination terminal address as a destination terminal ID to the distance vector table 6, which returns the PDV terminal ID stored in the entry including the destination terminal ID. The packet analyzer 2H sends the data packet and the PDV terminal ID received from the distance vector table 6 to the packet generator 3H to have the data packet transmitted from the communication unit 1 by single-path routing.

The distance vector table 6 is generally similar to the distance vector table 6 in the fifth embodiment, but each entry is stored for a predetermined retention time. The predetermined time may be set by, for example, an operating system kernel installed in the terminal. If a new DV terminal ID is received with a destination terminal ID for which the distance vector table 6 already holds an entry, the new DV terminal ID is placed in the ODV field of the entry if the packet ID received from the packet analyzer 2H matches the packet ID of the entry, and in the PDV field of the entry, replacing the existing PDV terminal ID, if the packet ID received from the packet analyzer 2H does not match the packet ID of the entry. In the latter case, the packet ID in the entry is also updated to the DV terminal ID received from the packet analyzer 2H, and the ODV field is cleared. In either case, the predetermined time for which the entry is held is extended; that is, the retention time is measured from the time when the most recent DV terminal ID is added to the entry.

In a variation of the eighth embodiment, the ODV field is eliminated from the distance vector table 6, so that each entry stores only a destination terminal ID, a primary distance vector (PDV) terminal ID, and a packet ID.

When queried by submission of a destination terminal ID, in the eighth embodiment the distance vector table 6 returns the PDV terminal ID corresponding to the destination terminal ID. If the distance vector table 6 does not hold an entry listing the submitted destination terminal ID, it returns information indicating the lack of such an entry.

The unconditional relay table 7 stores a pair of terminal IDs read from a zone control packet by the packet analyzer 2H for a predetermined time. The predetermined time may be set by, for example, the kernel installed in the terminal. A typical predetermined time is one minute.

The packet generator 3H generates packets and transmits them through the communication unit 1. More specifically, the packet generator 3H performs the following five processes.

A) To initiate communication, the packet generator 3H generates communication request packets, and packets replying to communication request packets, and transmits them through the communication unit 1, flooding the entire network. The packet generator 3H also generates data packets and transmits them through the communication unit 1, specifying the source and destination terminal addresses and the terminal ID of the first intermediate terminal on the shortest path to the destination terminal as a DV terminal ID.

B) When its own terminal is the source terminal, the packet generator 3H generates an assignment packet including the terminal IDs received from the packet analyzer 2H, specifying the two endpoint terminals and the median terminal or terminals assigned by the packet analyzer 2H, and transmits the assignment packet through the communication unit 1, addressed to each assigned median terminal.

C) When the terminal receives an assignment packet in which it is specified as a median terminal, the packet generator 3H generates a zone control packet including the two endpoint terminal IDs, the passive zone hopcount (hp), the active zone hopcount (ha), and the time-to-live hopcount (TTL=ha−1) received from the packet analyzer 2H, and transmits the zone control packet through the communication unit 1 by flooding, that is, without specifying any route restrictions. (The flooding is controlled by the time-to-live hopcount.)

D) Upon receiving a zone control packet and a new time-to-live (TTL) hopcount from the packet analyzer 2H, the packet-generator 3H updates the zone control packet by replacing the old TTL value with the new TTL value (thereby decrementing the TTL value by one), and transmits the updated zone control packet through the communication unit 1, again by flooding, without specifying a route.

E) Upon receiving an ordinary data packet accompanied by a new DV terminal ID from the packet analyzer 2H, the packet generator 3H replaces the DV terminal ID in the data packet with the new DV terminal ID received from the packet analyzer 2H and transmits the packet through the communication unit 1, to be relayed on the single-path route through the passive zone. Upon receiving an ordinary data packet from the packet analyzer 2H unaccompanied by a new DV terminal ID, the packet generator 3H removes the DV terminal ID (if present) from the routing information in the packet and transmits the packet through the communication unit 1, to be relayed by multipath flooding within the active zone.

Figure 35:
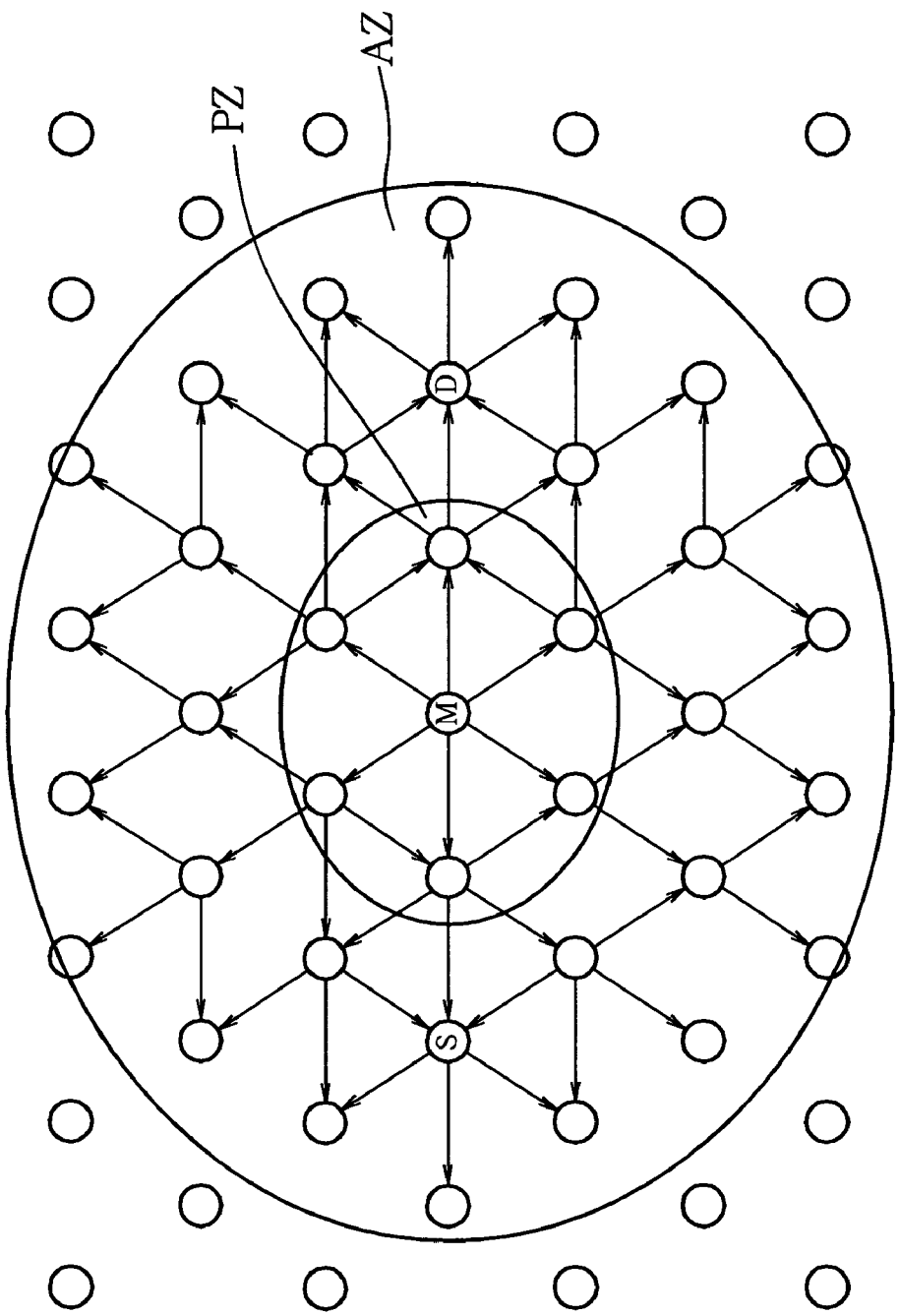
FIG. 35 illustrates a routing of a packet in an ad hoc network according to the eighth embodiment.
Figure 36:
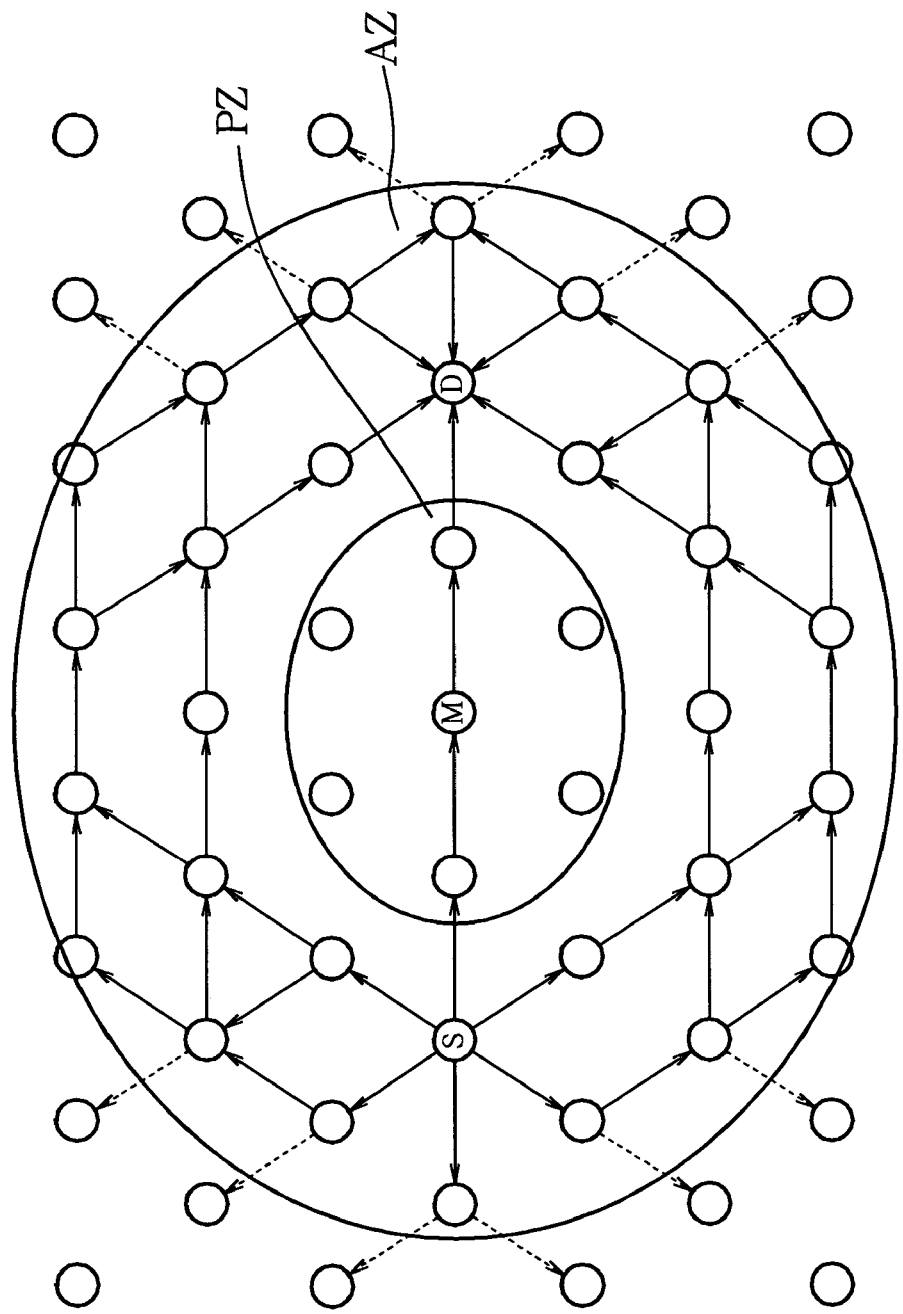
FIG. 36 illustrates the routing of a packet in an ad hoc network according to the eighth embodiment.

The operation of an ad hoc network configured with terminals according to the eighth embodiment is illustrated in FIGS. 35 and 36. The circles in these drawings represent terminals, S indicates a source terminal, D indicates a destination terminal, and M indicates a median terminal disposed between terminals S and D. PZ indicates the passive zone and AZ the active zone.

When the source terminal S communicates with the destination terminal D, it first collects information by flooding the network with communication request packets and analyzing the replies to find the shortest path to the destination terminal D, the number of hops on this path, and the IDs of the intermediate terminals on this path.

In the example illustrated, the shortest path from terminal S to terminal D has four hops, so terminal S selects terminal M, located midway between terminals S and D, just two hops from each, as a median terminal. Terminal S sends terminal M an assignment packet specifying the endpoint terminal IDs (the IDs of terminals S and D), a passive zone hopcount of one (hp=1), and an active zone hopcount of three (ha=3).

When terminal M receives the assignment packet from terminal S, it analyzes the packet to obtain the endpoint terminal IDs (of terminals S and D) and the passive zone hopcount (hp=1) and active zone hopcount (ha=1) for communication between terminals S and D, sets the time-to-live hopcount (TTL=ha−1=2), generates a zone control packet including the two endpoint terminal IDs, the active and passive zone hopcounts (hp=1 and ha=3), and the time-to-live hopcount (TTL=2), and transmits the zone control packet by flooding, without specifying a route.

A packet receiving the zone control packet transmitted from terminal M analyzes the packet to obtain the passive zone hopcount (hp=1), active zone hopcount (ha=3), and time-to-live hopcount (TTL=2, 1, or 0). If ha−TTL≦hp, the terminal recognizes that it is in the passive zone PZ. If ha−TTL>hp, the terminal recognizes that it is in the active zone AZ, and stores the pair of endpoint terminal IDs (the IDs of terminals S and D), which are also obtained from the packet analysis, in the unconditional relay table 7. In either of these two cases, if the time-to-live hopcount TTL is greater than zero, the terminal transmits the packet onward with the TTL value reduced by one. In the example illustrated, the zone control packet is transmitted for three hops outward from terminal M, at which point the TTL value is zero and relay of the packet ceases. Packets that do not receive the zone control packet are in neither the active nor the passive zone for communication between terminals S and D. This completes the routing preparations.

Next, terminal S transmits a packet of data it wishes to send to terminal D. As routing information, the terminal places the terminal ID of the first terminal on the shortest path to the destination terminal in the packet as a DV terminal ID, together with the address of the source terminal S and the destination terminal D. Among the terminals that receive the data packet from terminal S, those terminals that are in the active zone AZ relay the packet immediately, removing the DV terminal ID. The packet then floods through the active zone AZ, as indicated by the arrows, taking multiple paths to the destination terminal D.

Terminals in the passive zone PZ relay the data packet only if their terminal ID matches the single DV terminal ID specified in the packet. Each time the packet is relayed in the passive zone PZ, the DV terminal ID is updated to indicate the next terminal on a single-path route to the destination terminal, so that the packet follows this route to the destination terminal. The single-path route is normally the shortest path found by the source terminal during the preparatory stage, passing through the median terminal M as shown in FIG. 36.

If a terminal that receives the data packet from terminal S is in neither the active zone AZ nor the passive zone PZ, it abandons the data packet.

Although there is only one median terminal M in the passive zone PZ in FIGS. 35 and 36, as noted above, a plurality of median terminals may be assigned. In the maximum case, all three terminals on the shortest path may be assigned as median terminals. As also noted above, the median terminals may be assigned by either the source terminal or the destination terminal, or may be self-assigned when they recognize the start of communication. If the network includes a cluster head or home agent disposed between the source and destination terminals, the median terminals may be assigned by the cluster head or source agent. (A cluster head is a backbone terminal in a cluster of terminals; a home agent manages mobile terminals in an Internet protocol network.)

In conventional multipath routing, extremely complex processes have been used to select non-interfering paths, because when simpler processes have been employed, neighboring terminals have generally tended to transmit colliding packets, causing packet loss and delays. The eighth embodiment uses a simple zoning scheme that provides a single main path through the passive zone, and multiple backup paths through the active zone. The single path through the passive zone is substantially free of interference because the backup paths detour around the passive zone, which acts as a buffer zone. The paths through the active zone are not entirely free of interference, but interference is reduced to the interference that may be generated by a small number of neighboring terminals in the active zone. Under favorable transmission conditions, a packet arrives at the destination terminal first via the main path, with the same delay and bandwidth usage as in single-path routing schemes; later arrivals via the detour paths in the active zone are ignored. Under unfavorable conditions, if the single path fails, communication can still continue using the detour paths in the active zone as backup paths.

The eighth embodiment provides a way to establish spatially separated main and backup paths without complex processing, so that communication is stabilized, interference is reduced, and network resources are used effectively.

The routing schemes used in the eighth embodiment can be modified in various ways. For example, source routing can be employed in the passive zone, by having the source terminal specify the shortest route in the routing information it adds to a data packet. Distance vector routing can be used in the active zone, using both the PDV terminal IDs and ODV terminal IDs stored in the distance vector table 6 of each terminal in the active zone. The unconditional relay table 7 can be modified to store information indicating whether the terminal is in the active zone or the passive zone, so that a terminal in the passive zone will not unnecessarily relay a packet received from a terminal in the active zone.

The hopcount information placed in a zone control packet may be limited to the time-to-live hopcount (TTL) and the difference between the active and passive zone hopcounts (ha−hp).

Ninth Embodiment

The ninth embodiment modifies the eighth embodiment so that when communication conditions are stable, packets are transmitted only on the single path in the passive zone. When communication conditions are unstable, packets are transmitted only on the multiple detour paths in the active zone, or on omnidirectional multiple paths including both the single path in the passive zone and the detour paths in the active zone as in the eighth embodiment. Accordingly, communication is switched among three transmission modes. Besides these three modes, a fourth mode may be added in which, when communication conditions are extremely unstable, packets are transmitted by conventional multipath routing using all terminals in the communication space.

Figure 37:
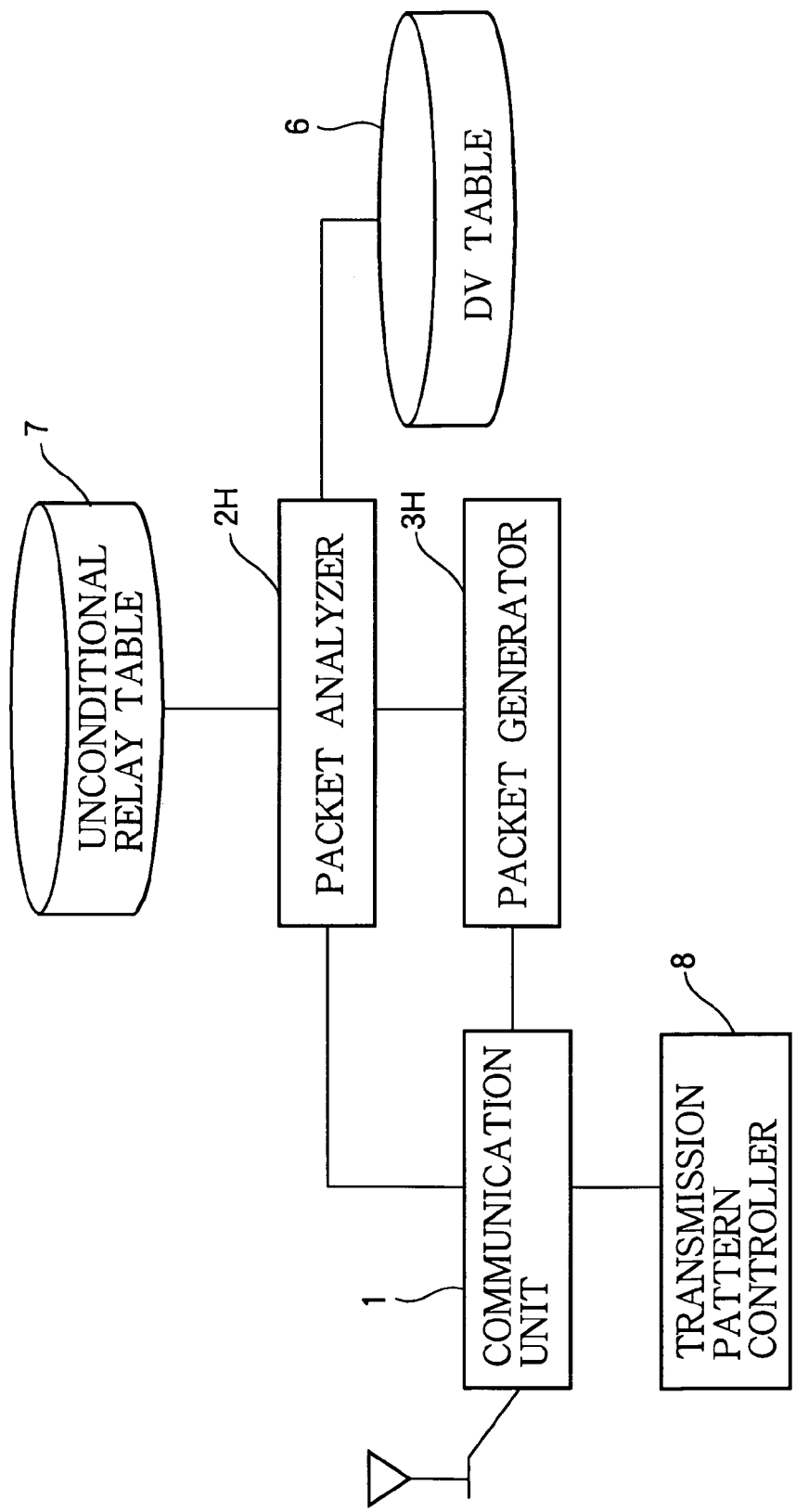
FIG. 37 is a block diagram of a wireless communication terminal according to a ninth embodiment.

Referring to FIG. 37, a terminal in the ninth embodiment comprises the communication unit 1, packet analyzer 2H, packet generator 3H, distance vector table 6, and unconditional relay table 7 of the eighth embodiment, and a transmission pattern controller 8.

The transmission pattern controller 8 monitors the stability of communication in the network through the communication unit 1 by monitoring the frequency with which links are broken, packets are lost, etc., and selects the optimum one of the above three modes (single-path routing in the passive zone only, detour multipath routing in the active zone only, or omnidirectional multipath routing in both the active zone and the passive zone), depending on the degree of communication stability, and controls the operation of the packet analyzer 2H so that packets are transmitted in the selected mode.

In one exemplary selection scheme, the single-path-only mode is selected under highly stable communication conditions, the detour-path-only mode is selected to provide a plurality of paths if communication is slightly unstable, and the omnidirectional multipath mode is selected to provide a larger number of paths when communication is more unstable.

By operating in different modes under different communication conditions, the ninth embodiment uses network resources more efficiently than the eighth embodiment, responding to communication instability by increasing the number of paths in a series of steps.

Tenth Embodiment

The tenth embodiment modifies the eighth embodiment by dividing the active zone into a plurality of subzones.

The active zone is subdivided on the basis of hopcounts obtained from the zone control packets. The subzones are also prioritized. Terminals in the highest-priority subzone relay packets immediately; terminals in lower-priority subzones suspend the relaying of packets, waiting to see if the same packet is relayed by a terminal in a higher-priority subzone. Much as in the first embodiment, a packet is abandoned if it is seen to have been relayed by a terminal in a higher-priority zone within a predetermined time, and is relayed if this is not observed. A suspended packet is considered to have been relayed by a terminal in a higher-priority subzone if an identical packet is received within the predetermined suspension time; if no identical packet is received, the suspended packet is transmitted at the end of the predetermined suspension time.

For example, if the passive zone hopcount is one (hp=1) and the active zone is divided into a first active subzone (the highest-priority subzone) with a hopcount of two (ha1=2), a second active subzone with a hopcount of three (ha2=3), and a third active zone with a hopcount of four, equal to the active zone hopcount of the entire active subzone (ha=4), a terminal receiving a zone control packet with an active hopcount of four (ha=4) and a time-to-live value of three (TTL=3) recognizes that it is in the passive zone (because ha−TTL≦hp), a terminal receiving a zone control packet with a time-to-live value of two (TTL=2) recognizes that it is in the first active subzone (because hp<ha−TTL≦ha1), a terminal receiving a zone, control packet with a time-to-live value of one (TTL=1) recognizes that it is in the second active subzone (because ha1<ha−TTL≦ha2), and a terminal receiving a zone control packet with a time-to-live value of one (TTL=1) recognizes that it is in the third active subzone (because ha2<ha−TTL≦ha). For simplicity, the three active subzones will be referred to below as the first active zone, the second active zone, and the third active zone.

A terminal in the first active zone relays a packet as soon as it is received. A terminal in the second active zone holds a received packet suspended for a time A, abandons the suspended packet if it detects the relay of an identical packet by another terminal within time A, and otherwise relays the packet itself at the end of time A. A terminal in the third active zone holds a received packet suspended for a longer time B (B>A), abandons the suspended packet if it detects the relay of an identical packet by another terminal within time B, and otherwise relays the packet itself at the end of time B.

Figure 38:
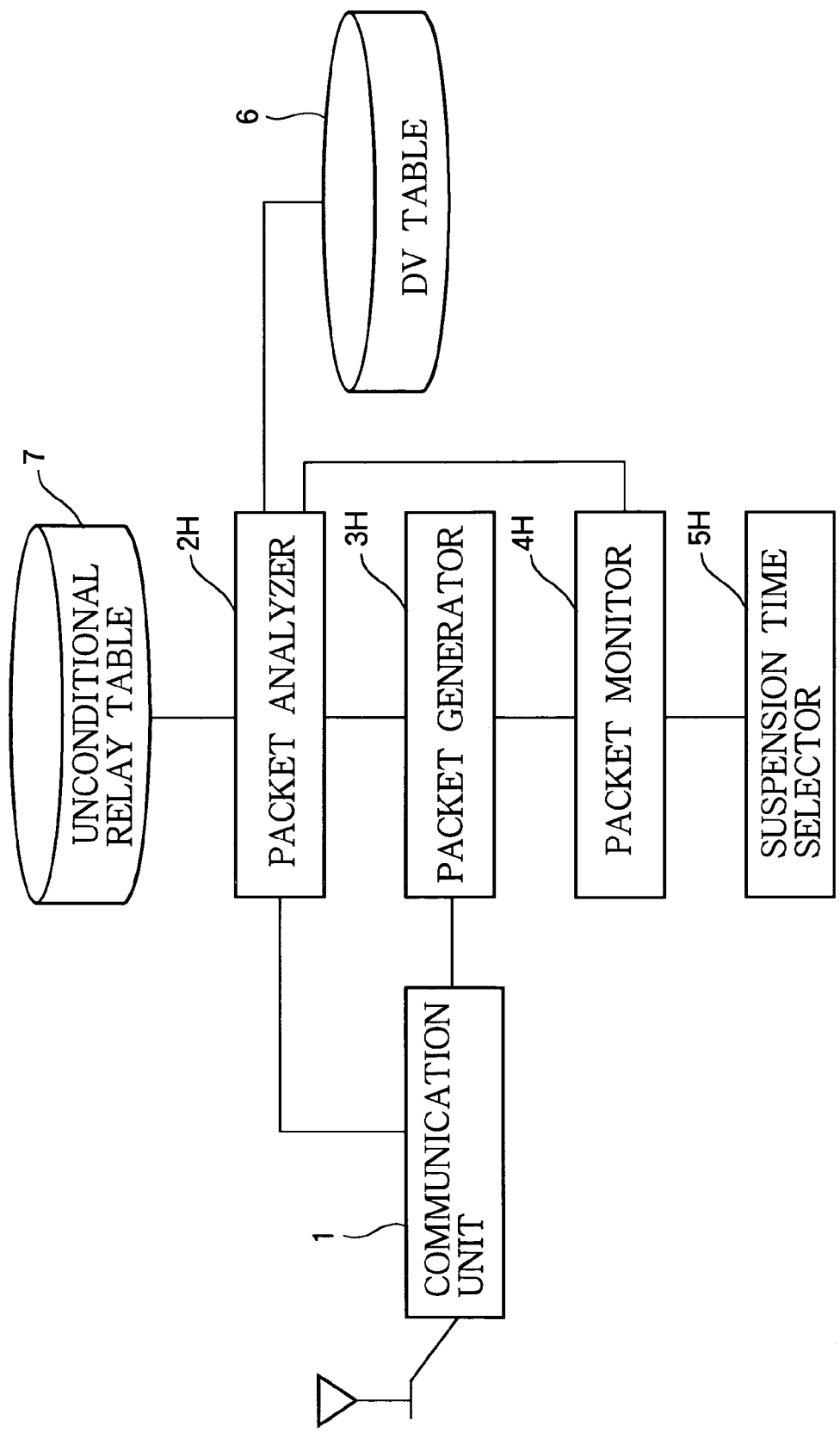
FIG. 38 is a block diagram of a wireless communication terminal according to a tenth embodiment.

Referring to FIG. 38, a wireless communication terminal in the tenth embodiment comprises the communication unit 1, the packet analyzer 2H, the packet generator 3H, the distance vector table 6, and the unconditional relay table 7 of the eighth embodiment, and a packet monitor 4H and a suspension time selector 5H.

If the active zone is divided into three subzones as described above, then when the communication unit 1 receives an assignment packet specifying the terminal as a median terminal, the packet analyzer 2H reads the passive zone hopcount (hp) and the three active zone hopcounts (ha1, ha2, ha) from the received packet and calculates a time-to-live hopcount (TTL=ha−1), and the packet generator 3H adds these hopcounts to a zone control packet.

When the communication unit 1 receives a zone control packet, the packet analyzer 2H reads the hopcounts (hp, ha1, ha2, ha, TTL) to decide whether the terminal is in the passive zone (if ha−TTL≦hp), the first active zone (if hp<ha−TTL<ha1), the second active zone (if ha1<ha−TTL≦ha2), or the third active zone (if ha2<ha−TTL≦ha). If the terminal is in one of the active zones, information indicating which active zone it belongs to is stored in the unconditional relay table 7 together with the two endpoint terminal IDs.

When the communication unit 1 receives a data packet, the packet analyzer 2H reads the two endpoint terminal IDs from the packet and accesses the unconditional relay table 7. If these two endpoint terminal IDs are stored in the unconditional relay table 7 together with information indicating that the terminal is in the first active zone, the packet analyzer 2H sends the data packet to the packet generator 3H for immediate relay through the communication unit 1. If these two endpoint terminal IDs are stored in the unconditional relay table 7 together with information indicating that the terminal is in the second or third active zone, the packet analyzer 2H sends the data packet to the packet monitor 4H to be held suspended for the suspension time set by the suspension time selector 5H.

The packet monitor 4H holds a packet received from the packet analyzer 2A for a suspension time set by the suspension time selector 5H, operating in the same way as the packet monitor 4A in the first embodiment, except that the suspension time set by the suspension time selector 5H varies depending on the subzone of the active zone to which the terminal belongs.

The suspension time selector 5H sets the suspension time according to the priority of the active subzone to which the terminal belongs, setting longer times for lower priorities. For example, the suspension time B set for the third active zone is longer than the suspension time A set for the first active zone (B>A).

Figure 39:
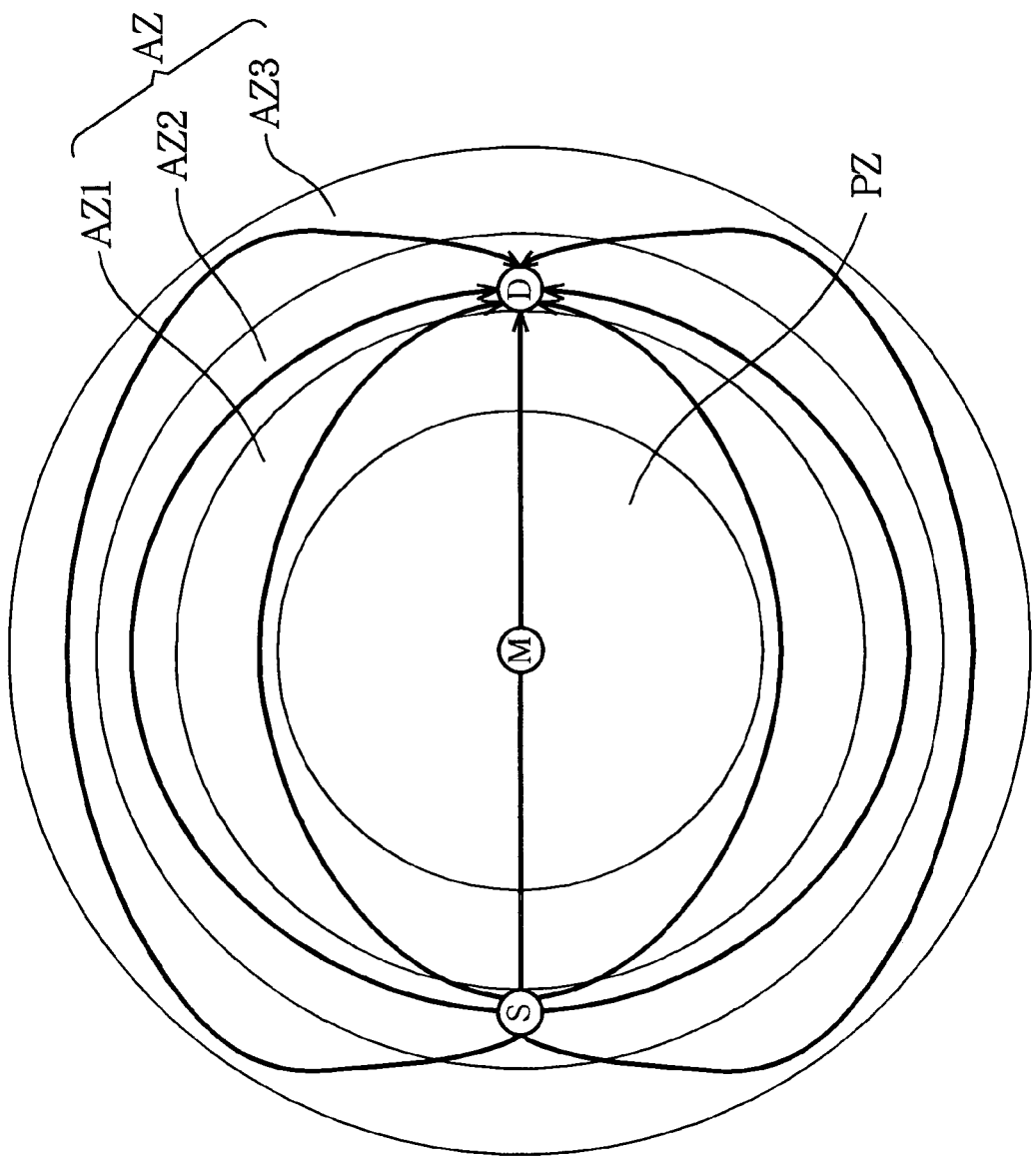
FIGS. 39 and 40 illustrate the routing of packets in ad hoc networks according to the tenth embodiment.
Figure 40:
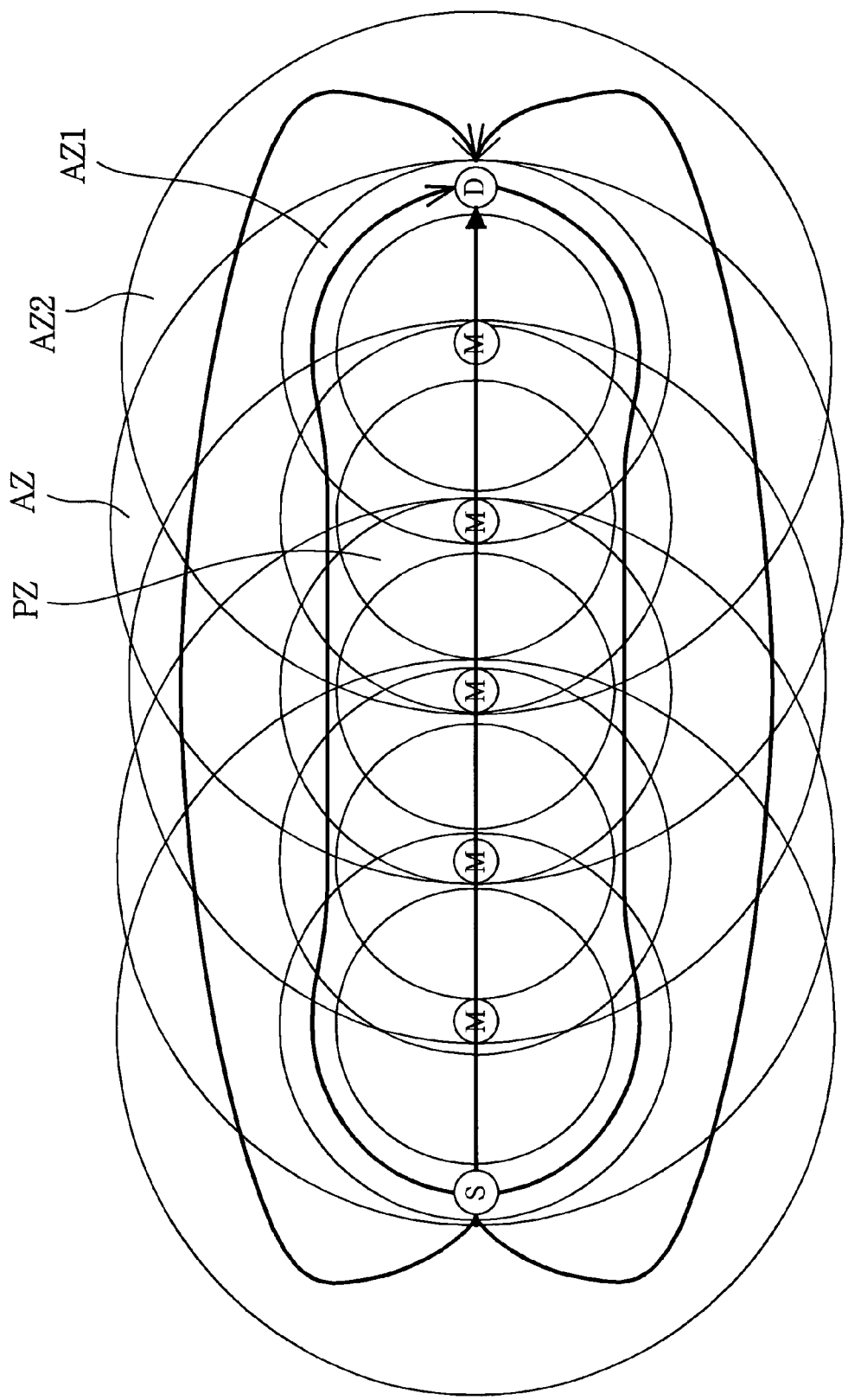

FIGS. 39 and 40 illustrate ad hoc networks using the routing scheme of the tenth embodiment. The circles marked S, M, and D represent source, median, and destination terminals, respectively. The passive zone PZ is surrounded by an active zone AZ that is divided into three subzones A1, A2, A3 in FIG. 39, and into two subzones A1, A2 in FIG. 40.

In FIG. 39, a single median terminal M is assigned between the source terminal S and destination terminal D. The main path from terminal S to terminal D is a single path passing through the median terminal M. Additional backup paths from terminal S to terminal D pass through the first active zone AZ1, detouring around the passive zone PZ. Further backup paths pass through the second active zone AZ2 and the third active zone AZ3, taking more circuitous detour routes from terminal S to terminal D.

In FIG. 40, five median terminals M are assigned between the source terminal S and destination terminal D. The main path from terminal S to terminal D is a single path passing through all five median terminals M. Additional backup paths from terminal S to terminal. D pass through the first active zone AZ1, detouring around the passive zone PZ, which has a substantially elliptical shape formed by the overlap of substantially circular zones around the five median terminals M. Further backup paths from terminal S to terminal D pass through the second active zone AZ2, detouring around the first active zone AZ1.

The main paths in FIGS. 39 and 40 are protected from interference from the backup paths in the active zones AZ by the passive zone PZ, which functions as a buffer zone. Although all paths converge at the destination terminal, packets routed on the main path arrive before packets routed on the backup paths, which have higher hopcounts, so interference at the destination terminal D is also avoided.

The backup paths in the first active zone AZ1 are protected from interference from the main path by the passive zone PZ, and from interference from the second active zone AZ2 by the suspension time that halts or delays the relay of packets in the second active zone. In FIG. 39, interference between packets routed on the backup paths in the second active zone AZ2 and packets routed on the backup paths in the third active zone AZ3 is prevented by the different suspension times used in those two zones.

A few variations of the preceding embodiments have been pointed out above, but those skilled in the art will recognize that further modifications are possible within the scope of the invention, which is defined in the appended claims.

What is claimed is:

1. A communication terminal for use in a communication network, comprising:
   means for generating routing information for routing packets from a source terminal to a destination terminal on both a single-path route in the communication network and a multipath route in the communication network, the source terminal and the destination terminal being an arbitrary pair of the communication terminals in the communication network;
   means for placing said routing information in packets and transmitting said packets to neighboring communication terminals in the communication network; and
   means for analyzing the routing information in packets received from said neighboring terminals in the communication network;
   means for determining a suspension time; and
   means for suspending transmission of a received packet for said suspension time, abandoning the suspended packet if an identical packet is received during the suspension time, the identical packet also being abandoned, and transmitting the received packet at the end of the suspension time if no identical packet is received from another communication terminal in the communication network during the suspension time,
   wherein the single-path route is separated from the multipath route so that signals transmitted on the multipath route do not interfere with signals transmitted on the single-path route.

2. The communication terminal of claim 1, wherein the means for determining the suspension time determines the suspension time by monitoring signal conditions at other communication terminals in the communication network.

3. The communication terminal of claim 1, wherein the means for determining the suspension time determines the suspension time by monitoring packet transmission activity by the neighboring communication terminals on the single-path route.

4. The communication terminal of claim 1, wherein the means for determining the suspension time determines the suspension time by monitoring both signal conditions at other communication terminals in the communication network and packet transmission activity by the neighboring communication terminals on the single-path route.

5. The communication terminal of claim 1, wherein the means for determining the suspension time determines the suspension time randomly.

6. The communication terminal of claim 1, wherein the means for determining the suspension time determines the suspension time from a number of packet flows currently being relayed by the communication terminal.

7. The communication terminal of claim 6, wherein the means for suspending suspends packet transmission if the communication terminal is currently relaying more than a predetermined number of packet flows, even if the communication terminal is disposed on the single-path route.

8. The communication terminal of claim 1, wherein:
   the means for analyzing obtains, as part of the routing information in a received packet, information identifying one terminal on the single-path route and one or more terminals on the multipath route that are to transmit the received packet next;
   if the communication terminal is said one terminal on the single-path route, the means for placing updates said part of the routing information in the received packet and transmits the received packet immediately; and
   if the communication terminal is among said one or more terminals on the multipath route, the means for suspending suspends the packet, and the means for placing updates said part of the routing information in the received packet and transmits the received packet if the received packet is not abandoned during the suspension time.

9. The communication terminal of claim 1, further comprising means for storing a table of entries listing communication terminal identifiers and packet identifiers, the communication terminal identifiers listed in each entry having fields for storing a destination terminal identifier, one primary terminal identifier of a next communication terminal on the single-path route to the destination terminal identified by the destination terminal identifier, and one or more secondary terminal identifiers identifying one or more next communication terminals on the multipath route to the destination terminal identified by the destination terminal identifier, wherein:
   when the communication terminal receives a packet including a source terminal identifier identifying a communication terminal from which the packet originated, a neighboring terminal identifier identifying a communication terminal from which the packet was received, and a packet identifier identifying the packet, if the source terminal identifier and the packet identifier in the received packet match the destination terminal identifier and the packet identifier of an entry in said table, the means for analyzing adds the neighboring terminal identifier to said entry as a secondary communication terminal identifier, if the source terminal identifier in the received packet matches the destination terminal identifier of an entry in said table and the packet identifier in the received packet does not match the packet identifier in said entry the means for analyzing replaces the primary terminal identifier in the entry with the neighboring terminal identifier, replaces the packet identifier of the entry with the packet identifier of the received packet, and if the neighboring terminal entry is present in the secondary terminal identifier field of the entry, deletes the neighboring terminal entry from the secondary terminal identifier field of the entry, whereas if the source terminal identifier in the received packet does not match any destination terminal identifier in the table, the means for analyzing adds a new entry to the table, the new entry having the source terminal identifier of the received packet in its destination terminal identifier field, the neighboring terminal identifier of the received packet in its primary terminal identifier field, and the packet identifier of the received packet in its packet identifier field, and having no communication terminal identifier in its secondary terminal identifier field;
   when the communication terminal receives a packet including a destination terminal identifier matching the destination terminal identifier of an entry in said table, if the packet also includes a primary terminal identifier identifying the communication terminal receiving the packet, the means for placing immediately transmits the packet, replacing the primary terminal identifier in the packet with the primary terminal identifier of said entry in the table, and replacing any secondary terminal identifiers in the packet, if present, with the secondary terminal identifiers of said entry in the table;

when the communication terminal receives a packet including a destination terminal identifier matching the destination terminal identifier of an entry in said table, if the packet also includes a secondary terminal identifier identifying the communication terminal receiving the packet, the means for suspending suspends transmission of the packet, and if the means for suspending does not abandon the packet during the suspension time, the means for placing transmits the packet upon expiration of the suspension time, replacing the primary terminal identifier in the packet with the primary terminal identifier of said entry in the table, and replacing any secondary terminal identifiers in the packet, if present, with the secondary terminal identifiers of said entry in the table; and when the communication terminal receives a packet including a destination terminal identifier not matching the destination terminal identifier of any entry in said table, the received packet is abandoned.

10. A particular communication terminal for use in a communication network that includes a plurality of communication terminals, each of the communication terminals having:

means for generating routing information for routing packets from a source terminal to a destination terminal on both a single-path route in the communication network and a multipath route in the communication network, the source terminal and the destination terminal being an arbitrary pair of the communication terminals in the communication network;

means for placing said routing information in packets and transmitting said packets to neighboring communication terminals in the communication network; and means for analyzing the routing information in packets received from said neighboring terminals in the communication network, wherein the single-path route is separated from the multipath route so that signals transmitted on the multipath route do not interfere with signals transmitted on the single-path route, wherein the multipath route is spatially separated from the single-path route by using the routing information to designate a first zone and a second zone in the communication network, the single-path route being disposed in the first zone, the multipath route being disposed in the second zone, and wherein the particular communication terminal further comprises means for selecting at least:

a first operating mode in which the means for placing transmits a received packet addressed to the destination terminal only if the communication terminal is in the first zone;

a second operating mode in which the means for placing transmits the received packet only if the communication terminal is in the second zone; and a third operating mode in which the means for placing transmits the received packet if the communication terminal is in either the first zone or the second zone.

11. A communication networks, comprising a plurality of communication terminals, each of the communication terminals having:

means for generating routing information for routing packets from a source terminal to a destination terminal on both a single-path route in the communication network and a multipath route in the communication network, the source terminal and the destination terminal being an arbitrary pair of the communication terminals in the communication network;

means for placing said routing information in packets and transmitting said packets to neighboring communication terminals in the communication network; and means for analyzing the routing information in packets received from said neighboring terminals in the communication network, wherein the single-path route is separated from the multipath route so that signals transmitted on the multipath route do not interfere with signals transmitted on the single-path route, wherein the multipath route is spatially separated from the single-path route by using the routing information to designate a first zone and a second zone in the communication network, the single-path route being disposed in the first zone, the multipath route being disposed in the second zone, and wherein at least one communication terminal on the single-path route is designated as a median terminal, the first zone including all communication terminals within the communication network that are within a first number of hops of the median terminal, the second zone including all communication terminals in the communication network that are within a second number of hops from the median terminal and are outside the first zone, the second number being larger than the first number.

12. A particular communication terminal for use in a communication network that includes a plurality of communication terminals, each of the communication terminals having:

means for generating routing information for routing packets from a source terminal to a destination terminal on both a single-path route in the communication network and a multipath route in the communication network, the source terminal and the destination terminal being an arbitrary pair of the communication terminals in the communication network;

means for placing said routing information in packets and transmitting said packets to neighboring communication terminals in the communication network; and means for analyzing the routing information in packets received from said neighboring terminals in the communication network, wherein the single-path route is separated from the multipath route so that signals transmitted on the multipath route do not interfere with signals transmitted on the single-path route, wherein the multipath route is spatially separated from the single-path route by using the routing information to designate a first zone and a second zone in the communication network, the single-path route being disposed in the first zone, the multipath route being disposed in the second zone, and wherein the particular communication terminal further comprises a first table and a second table, and wherein:

when the communication terminal receives, from an arbitrary neighboring terminal in the communication network, a packet originating at an arbitrary distant terminal in the communication network, the means for analyzing obtains identifiers of the neighboring terminal and distant terminal from the packet and stores the identifiers of the neighboring terminal and the distant terminal in the first table, designating the neighboring terminal as the next terminal on a single-path route to the distant terminal if the neighboring terminal is the first terminal from which the communication terminal receives the packet;

if the communication terminal is said source terminal, the means for generating generates hopcount information from the first number of hops and the second number of hops and generates a pair of endpoint terminal identifiers identifying the source terminal and the destination terminal, and the means for placing transmits the hopcount information and the pair of endpoint terminal identifiers in an assignment packet addressed to the median terminal; and if the communication terminal is the median terminal, the means for placing places the hopcount information, time-to-live information, and the pair of endpoint terminal identifiers in a zone control packet and transmits the zone control packet;

if the communication terminal receives the zone control packet, the means for analyzing determines, from the hopcount information and the time-to-live information, whether the communication terminal is in the second zone, and stores the pair of endpoint terminal identifiers in the second table if the communication terminal is in the second zone, and if the time-to-live hopcount is not zero, the means for placing updates the time-to-live information and transmits the packet with the updated time-to-live information;

if the communication terminal is said source terminal, when the communication terminal transmits a packet addressed to the destination terminal, the means for placing places identifiers of the source terminal and the destination terminal and the identifier of a nearest neighboring terminal, on the single-path route to the destination terminal, in the packet as said routing information;

when the communication terminal receives a packet addressed from the source terminal to the destination terminal, the means for analyzing uses the first table and the second table to determine whether the communication terminal is the next terminal on the single-path route to the destination terminal or the communication terminal is in the second zone, and if the communication terminal is the next terminal on the single-path route to the destination terminal or is in the second zone, the means for placing updates the routing information in the packet and transmits the packet.

13. A communication network, comprising a plurality of communication terminals, each of the communication terminals having:

means for generating routing information for routing packets from a source terminal to a destination terminal on both a single-path route in the communication network and a multipath route in the communication network, the source terminal and the destination terminal being an arbitrary pair of the communication terminals in the communication network;

means for placing said routing information in packets and transmitting said packets to neighboring communication terminals in the communication network; and means for analyzing the routing information in packets received from said neighboring terminals in the communication network, wherein the single-path route is separated from the multipath route so that signals transmitted on the multipath route do not interfere with signals transmitted on the single-path route, wherein the multipath route is spatially separated from the single-path route by using the routing information to designate a first zone and a second zone in the communication network, the single-path route being disposed in the first zone, the multipath route being disposed in the second zone, and wherein the second zone is subdivided into:

an inner subzone in which received packets addressed to the destination terminal are transmitted immediately; and an outer subzone in which the received packets addressed to the destination terminal are suspended temporarily at each communication terminal on the multipath route.

14. The communication network of claim 13, wherein the outer subzone is further subdivided into subzones with respective suspension times that increase with increasing distance from the first zone.

* * * * *

UNITED STATES PATENT AND TRADEMARK OFFICE
CERTIFICATE OF CORRECTION

PATENT NO.      : 7,664,032 B2  Page 1 of 1
APPLICATION NO. : 10/981630
DATED           : February 16, 2010
INVENTOR(S)     : Nakamura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1503 days.

Signed and Sealed this

Thirtieth Day of November, 2010

David J. Kappos
*Director of the United States Patent and Trademark Office*